(12) United States Patent
Christison et al.

(10) Patent No.: US 6,396,233 B1
(45) Date of Patent: May 28, 2002

(54) BALL JOINT GIMBAL SYSTEM

(75) Inventors: Donald Christison; Donald G. Quist; William S. Wight; Carl M. Zorzi, all of Ridgecrest; Randy Coleman, Palm Desert; Eric Frisbee, Ridgecrest; Wayne Reinke, Ridgecrest; Brian Wolfe, Ridgecrest, all of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/770,479

(22) Filed: Jan. 29, 2001

Related U.S. Application Data

(63) Continuation-in-part of application No. 09/655,386, filed on Sep. 5, 2000, now Pat. No. 6,326,759.

(51) Int. Cl.$^7$ .............................. G05B 11/32; H01Q 3/08
(52) U.S. Cl. ...................... 318/625; 318/652; 74/89.22; 244/3.16; 343/766
(58) Field of Search ................................. 318/560, 575, 318/580, 584, 625, 626, 652; 74/89, 89.2, 89.22; 250/203.6; 244/3.1, 3.15, 3.16; 343/757, 763, 765, 766

(56) References Cited

U.S. PATENT DOCUMENTS

| 3,742,358 | A | * | 6/1973 | Cesaro |
| 4,231,534 | A | * | 11/1980 | Lintell et al. |
| 4,281,614 | A | * | 8/1981 | McNary et al. |
| 4,282,529 | A | * | 8/1981 | Speicher |
| 4,392,140 | A | * | 7/1983 | Bastian et al. |
| 4,396,919 | A | * | 8/1983 | Speicher |
| 4,580,461 | A | * | 4/1986 | Sears et al. |

* cited by examiner

Primary Examiner—Bentsu Ro
(74) Attorney, Agent, or Firm—David Kalmbaugh

(57) ABSTRACT

A ball joint gimbal system which provides for a precise line-of-sight stabilization of a gimballed mirror that rides on a ball and its associated support structure. The mirror is positioned by four braided lines. The brained lines are driven by four servo motor with each servo motor being coupled to one of four capstan shafts. Each of the braided lines is wound around one of the four capstan shafts. The braided lines are positioned by optical shaft encoders. The low inertia of the gimballed mirror and the positioning of the mirror by the braided lines result in an extremely accurate and fast scanning optical pointing system. Inertial gimbal stabilization of the line of sight to a target is by a stabilization algorithm utilizing body rate information from body sensors which are components of the missile for providing autopilot and navigation functions for the missile.

20 Claims, 20 Drawing Sheets

BALL JOINT GIMBAL SYSTEM

This application is a continuation-in part of U.S. patent application Ser. No. 09/655,386, filed Sep. 05, 2000, now U.S. Pat. No. 6,326,759 B1.

BACKGROUND OF THE INVENTION

1. Field of the Invention

The present invention relates generally to missile tracking systems for tracking a target. More specifically, the present invention relates to a ball joint gimbal system for steering a gimballed mirror which is tracking a target.

2. Description of the Prior Art

A gimbal on a missile's seeker is used to establish a line of sight vector between a target and the missile's seeker. A visible or infrared sensor and associated optics are mounted on the gimbal. A narrow instantaneous field of view provides for long range tracking capability by the missile's seeker. The motion of the gimbal provides for a large angle of regard to accommodate the need for target acquisition which is off boresight. The image received by the seeker is stabilized in inertial space to decouple missile body motion which reduces blur. The gimbal is movable in elevation and azimuth so that closed loop tracking occurs. The angular rate of motion of the gimbal is measured to facilitate closed tracking.

Generally gimbals allow for orthogonal elevation and azimuth motion by including an inner gimbal platform, a gimbal ring and an outer gimbal fork. The inner gimbal platform has a number of components mounted thereon including an imager and its associated optical elements such as a mirror, lens or prism which provide the image. Rate or free gyros are mounted on the inner platform to provide inertial stabilization for the gimbal. A gimbal IR sensor has a cryogenic cooler.

A gimbal ring is attached to the inner gimbal platform on a shaft to allow for rotary motion of the gimbal. A torque motor and angle transducer are attached to this shaft. An orthogonal shaft attaches the gimbal ring to the outer gimbal fork. A second torque motor and associated angle transducer are attached to this orthogonal shaft. In addition, wires and cooling lines run across the gimbal axes. This causes a coupling between the axes so that body motion isolation is difficult to achieve.

The gimbal structure is complex and the mechanical components are very precise. The conventional gimbal is therefore very expensive and also large and heavy making it difficult to mount in the confined space of a seeker.

Accordingly, there is a need for a low cost, yet highly effective gimbal which is adapted for use with a missile's seeker.

SUMMARY OF THE INVENTION

The present invention overcomes some of the difficulties of the prior art including those mentioned above in that it comprises an inexpensive yet very accurate system for steering a gimballed mirror which is tracking a target being pursued by a missile in flight.

The ball joint gimbal system of the present invention provides for a precise line-of-sight stabilization of a gimballed mirror that rides on a ball and its associated support structure. The mirror is positioned by four braided lines. The brained lines are driven by four servo motor with each servo motor being coupled to one of four capstan shafts. Each of the braided lines is wound around one of the four capstan shafts. The braided lines are positioned by optical shaft encoders. The low inertia of the gimballed mirror and the positioning of the mirror by the braided lines result in an extremely accurate and fast scanning optical pointing system. Inertial gimbal stabilization of the line of sight to a target is by a stabilization algorithm utilizing body rate information from body sensors which are components of the missile for providing autopilot and navigation functions for the missile.

A digital signal processor receives externally generated steering signals from an external steering device, such as a joystick. The digital signal processor processes the signals to generate mirror position commands and provide the mirror position commands to the servo motor. The servo motors, responsive to the mirror position commands, continuously adjusting the length of each of the four braided lines to steer said gimballed mirror and maintain the line of sight to the target to continuously track the target.

DETAILED DESCRIPTION OF THE PREFERRED EMBODIMENT

Figure 1:
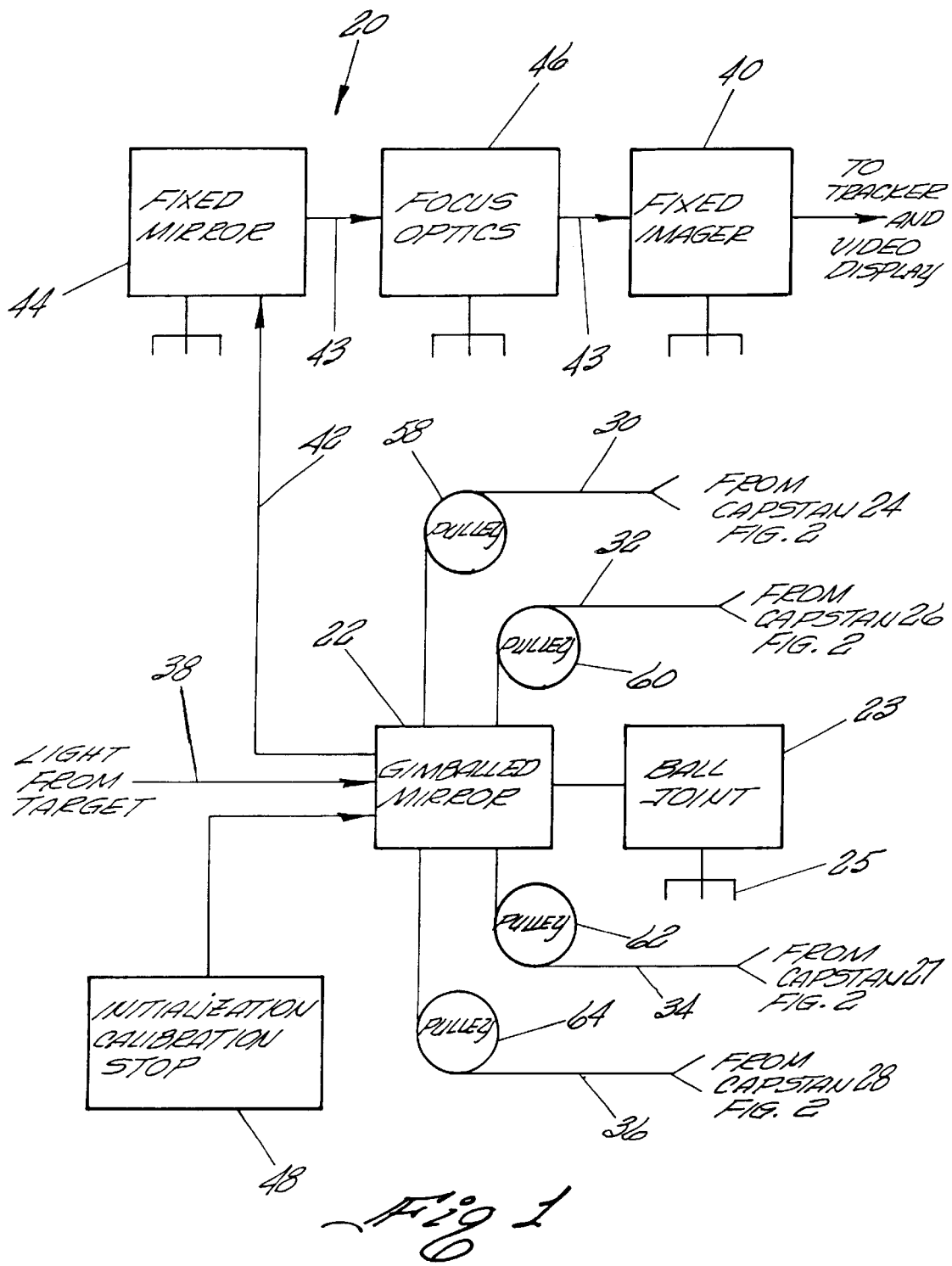
FIGS. 1 and 2 illustrate a block diagram of the ball joint gimbal system comprising the present invention.
Figure 2:
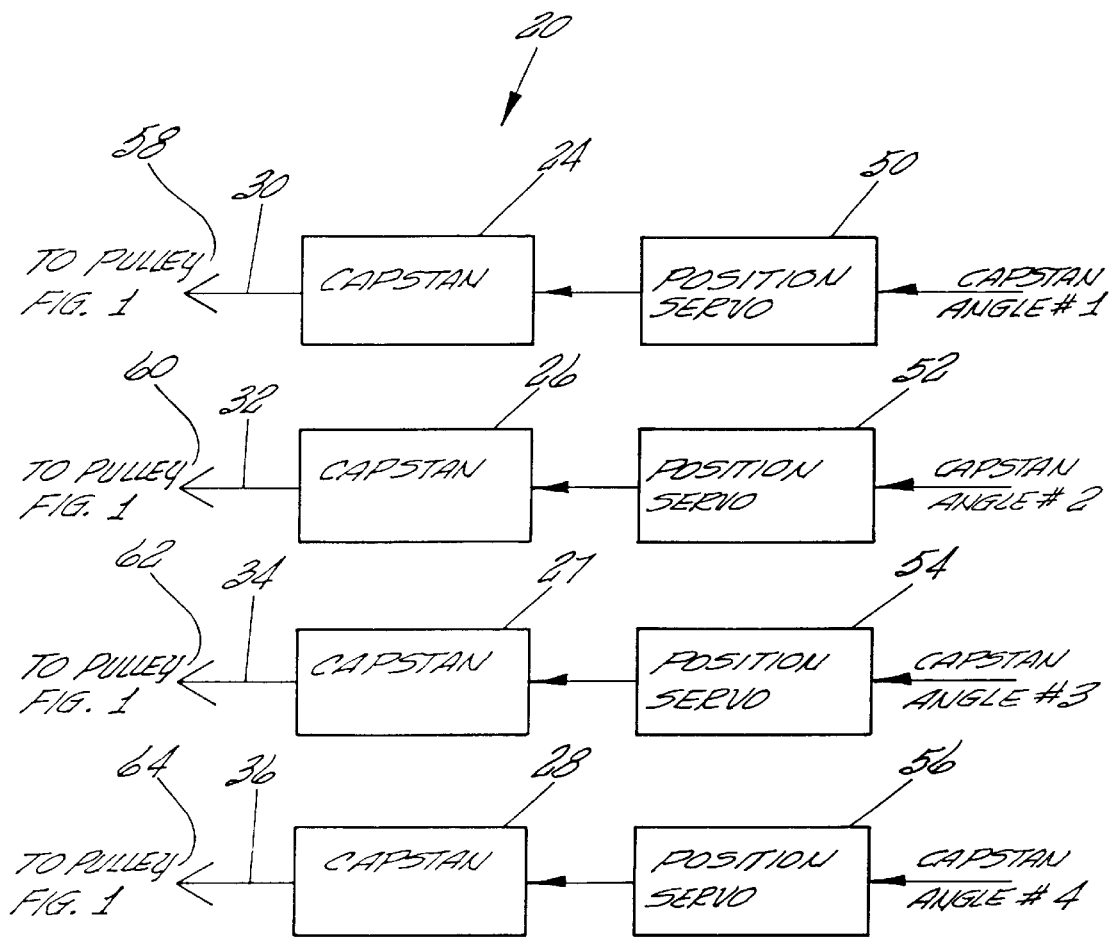

Referring to FIGS. 1 and 2, there is shown a ball joint gimbal system, designated generally by the reference numeral 20. A gimballed mirror 22 is attached to a seeker body with a ball joint 23 and its associated support structure 25. Ball joint 23 provides the mirror with an infinite set of mechanical axes to rotate around. Four servo driven capstans 24, 26, 27 and 28 rotate the mirror with four kevlar lines 30, 32, 34 and 36 which move an optical line of sight vector 38. A target image is formed on a stationary or fixed imager 40 by reflecting the light off the gimballed mirror 22 along optical path 42 to fixed mirror 44 and then along light path 43 through focus optics 46 to fixed imager 40. The image of the target is stabilized in inertial space by using the electrical signals from missile body mounted rate gyros 70, 72 and 74 (FIG. 3) to cause mirror 22 to move the correct amount to compensate for the motion of the missile.

Support structure 24 for gimballed mirror 22 includes a steel post which has one end attached to the body of the missile's and the other end attached to ball joint 23. A 0.250 inch precision ground steel ball comprises ball joint 23. The steel ball has a hole drilled part way into the steel ball. This hole allows the steel ball to be press fit onto the steel post. A ball socket, attached to the back side of mirror 22 couples the ball joint 23 to mirror 22. The ball socket was machined, coated with a dry film lubricant and lapped to the ball to reduce ball/socket friction.

A flat front silvered mirror of sufficient size to maximize the optical aperture yet small enough to fit in the available space is attached to the socket and assembled onto the ball joint 23. The mirror 22 has a 3.5 inch diameter mirror and is fabricated from 0.375 inch piece of aluminum. A socket retainer prevents the socket from separating from the ball during non operational status.

Referring again to FIGS. 1 and 2, four angular position servos 50, 52, 54 and 56 are attached in to the missile's seeker body. Precision capstans 24, 26, 27 and 28 are respectively attached to the shaft of precision servos 50, 52, 54 and 56. One end of kevlar line 30, 32, 34 or 36 is attached and wound around each precision capstan 24, 26, 27 or 28. The other end of each line 30, 32, 34 and 36 is attached to the back side of the gimballed mirror 22 at a different location on the backside of gimballed mirror 22. Each line 30, 32, 34 or 36 runs over a pulley 58, 60, 62 or 64 positioned to provide a geometry to pull on both the mirror and the capstan. The pull on the capstans 50, 52, 54 and 56 is at a slight angle to keep the cable lay tight. The pull on mirror 23 is at a substantial angle such that appropriate tension in kevlar lines 30, 32, 34 and 36 provide control in pitch, yaw and roll.

Kevlar lines 30, 32, 34 and 36 are 8×195 denier braided KEVLAR 49 lines. The kevlar lines 30, 32, 34 and 36 exhibit the properties of a high modulus of elasticity so that the lines 30, 32, 34 and 36 will not stretch and yet be flexible so that minimal force normal to each line 30, 32, 34 and 36 is needed to wind and unwind the lines 30, 32, 34 or 36 around its associated capstan and pulley.

As each of the position servos 50, 52, 54 and 56 is commanded by a capstan angle signal supplied to the position servo, mirror 22 moves in a controlled direction at the required angle to track the target. An initialization calibration stop 48 is provided so that the mirror capstan angles can be initialized at system start up.

The kevlar lines 30, 32, 34 and 36 are attached to the gimballed mirror 22 at a distance from the center of-ball joint 23 that is a factor of ten greater than the radius of the capstans 24, 26, 27 and 28. This causes the shaft of capstans 24, 26, 27 and 28 to move through an angle which is ten times greater than the mirror. Since the kevlar lines 30, 32, 34 and 36 don't stretch, gimballed mirror 22 can be controlled in angle ten times more accurately than the angle measurement of the servo shafts by the shaft encoders. This allows for a low cost design of the ball joint gimbal by allowing for the use of low cost shaft encoders within position servos 50, 52, 54 and 56.

Fixed mirror 44 is attached to the missile's seeker body. Light from a scene or target reflects off of gimballed mirror 22 travels along optical path 42 to fixed mirror 44 and is reflected from fixed mirror 42 to focus optics 46 which collects and focuses the light onto a fixed imager 40. Fixed imager 40 may be an infrared imager or a visible imager. Both the focus optics 46, which may be a lens and imager 40 are attached to the seeker body. As gimballed mirror 22 is moved by the kevlar lines 30, 32, 34 and 36, the line of sight vector 38 between the missile's seeker and target is also moved.

Electrical and/or cooling lines are not in proximity with or located across the ball joint 23. Only the gimballed mirror 22 moves with respect to the seeker body. Due to the gimballed mirror's reflection of light or infrared, the seeker line of sight vector 38 moves at twice the angle of mirror 22.

Figure 3:
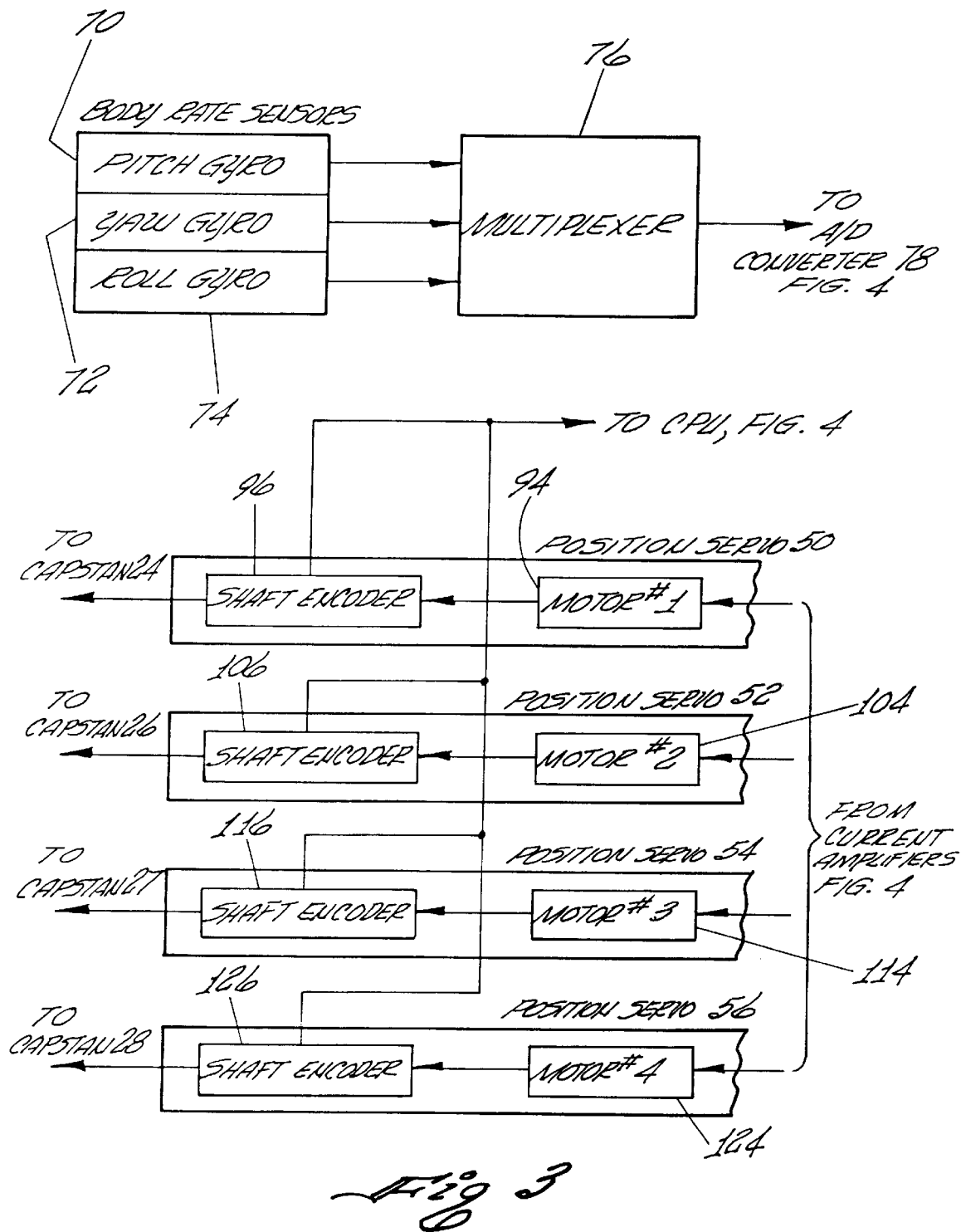
FIGS. 3 and 4 illustrate a block diagram of the mirror controller for the gimballed mirror of FIGS. 1 and 2.
Figure 4:
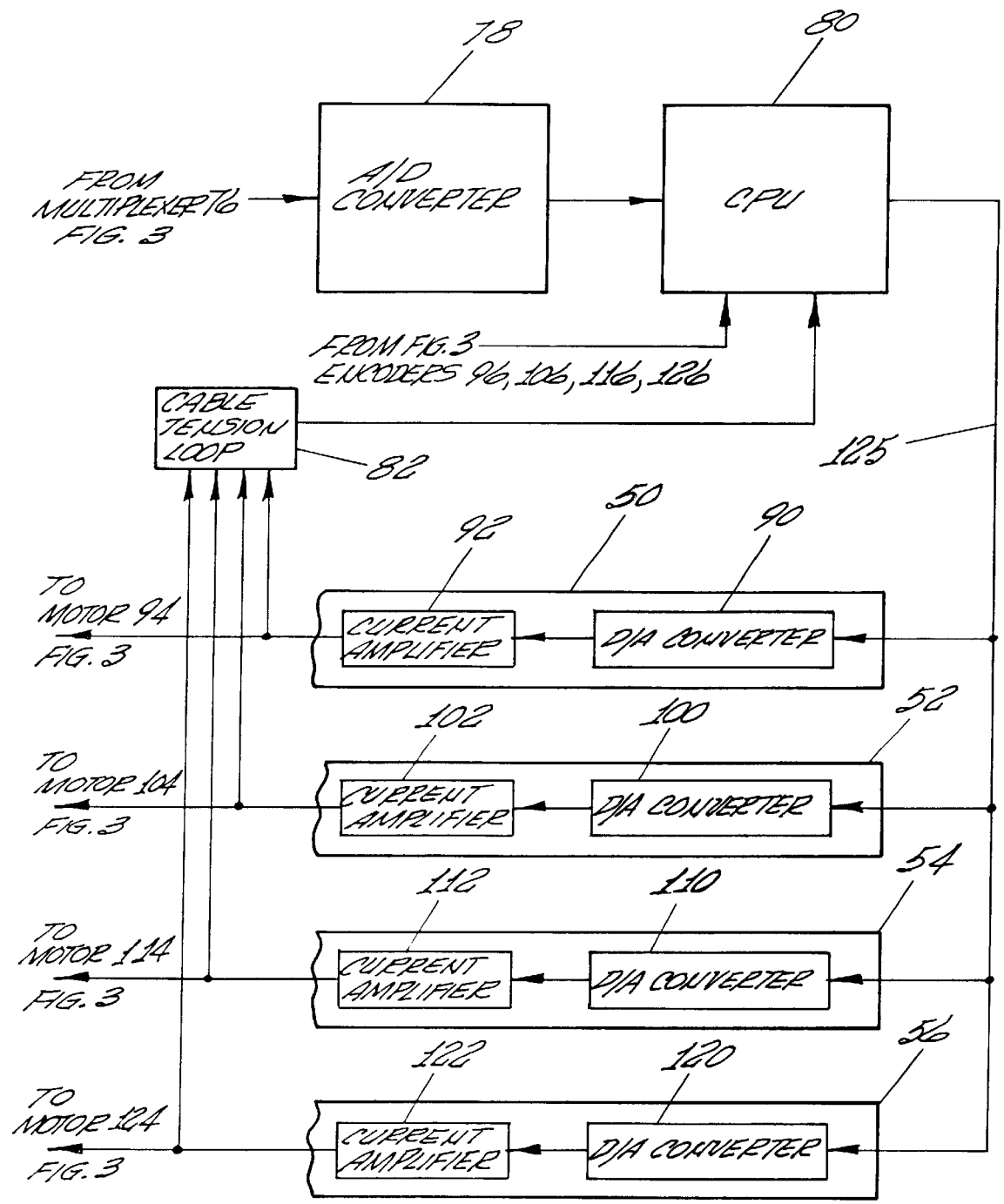
Figure 5:
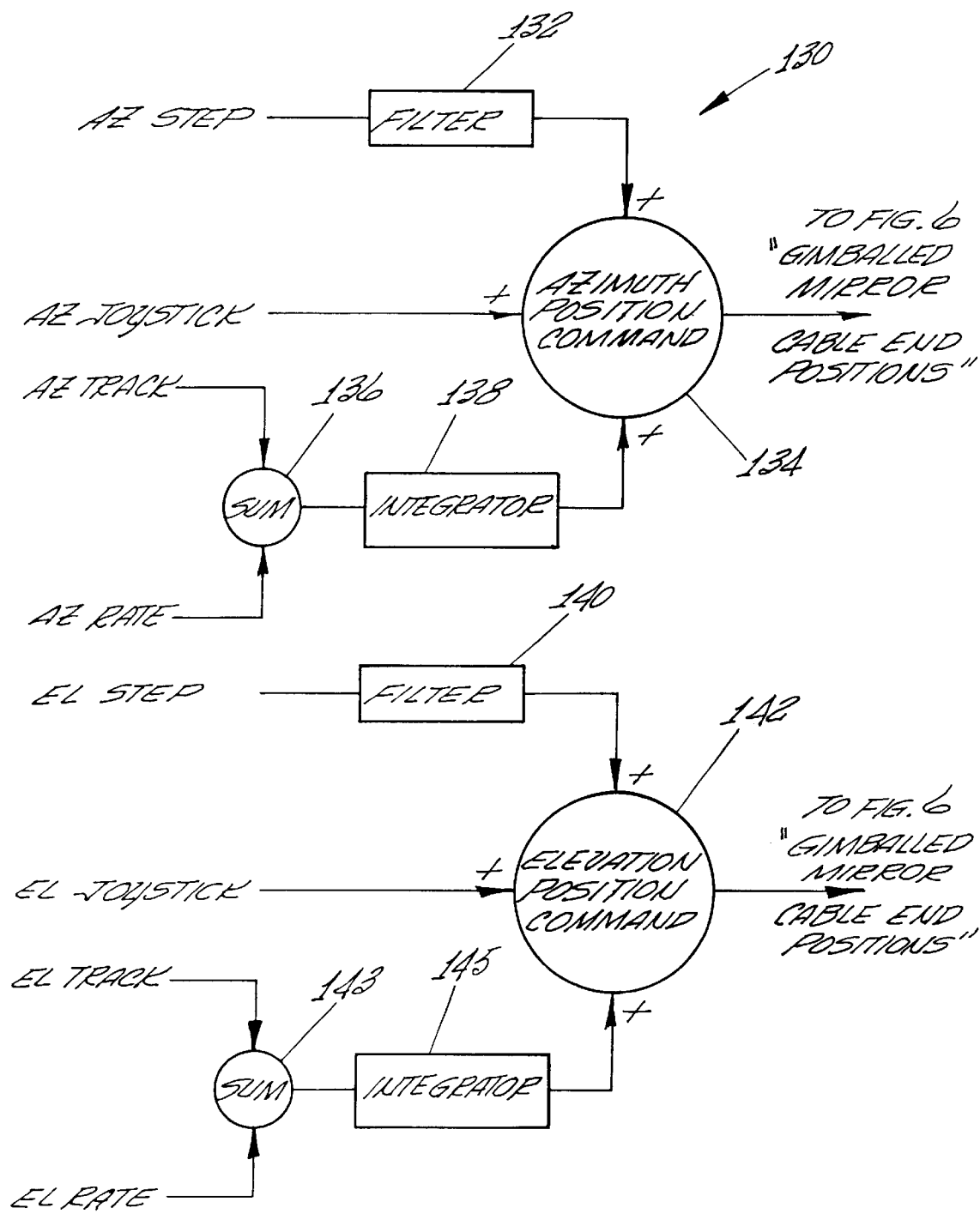
FIGS. 5 and 6 illustrate a block diagram of a system for calculating a length for each of the four braided lines which steer the gimballed mirror of FIG. 1.
Figure 6:
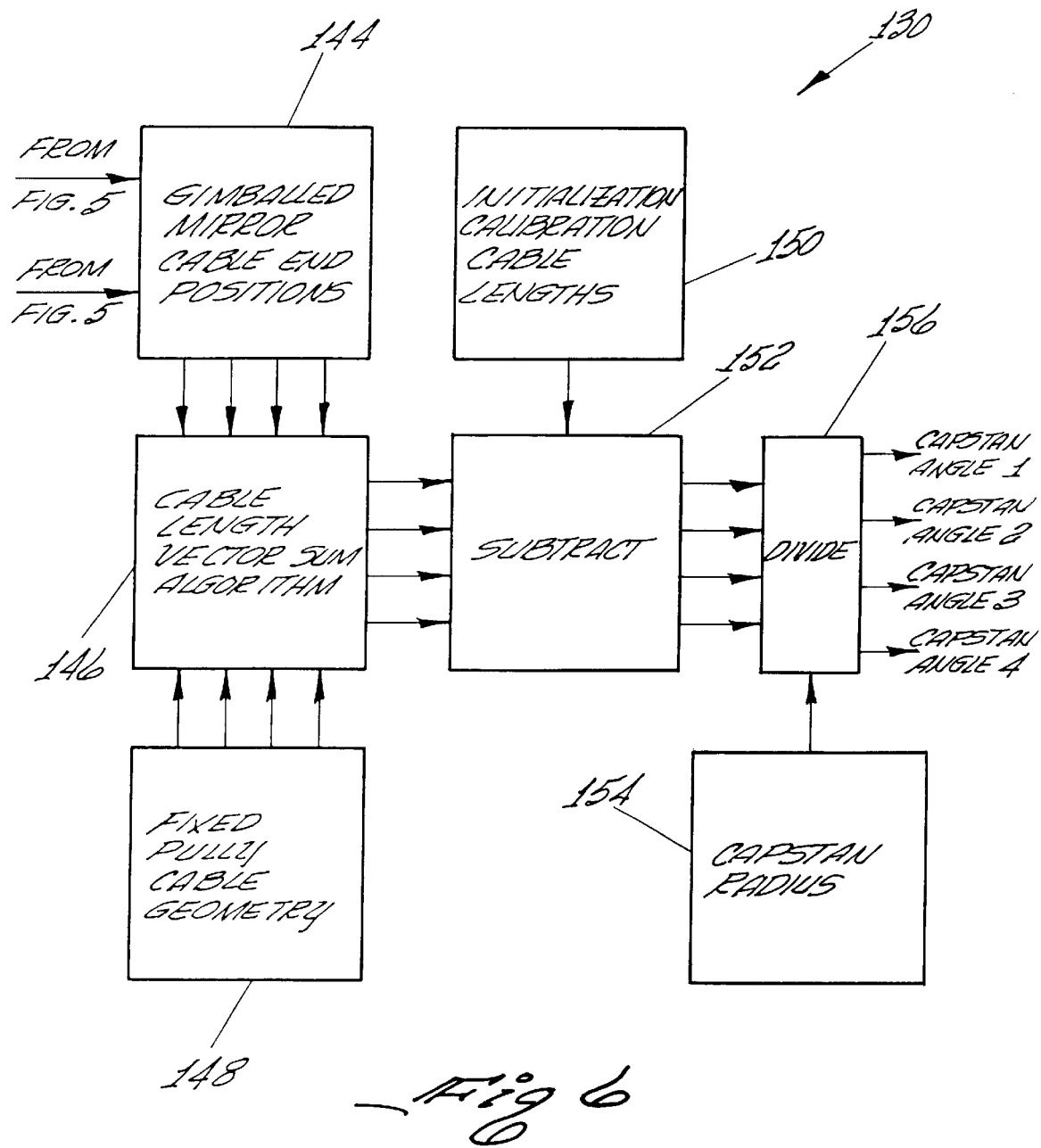

Referring to FIGS. 3 and 4, each position servo 50, 52, 54 and 56 comprises a digital to analog converter connected to a current amplifier which is connected to a servo motor. The shaft encoder is integral to the servo motor. Position servo 50 includes digital to analog converter 90, current amplifier 92, servo motor 94 and shaft encoder 96. Position servo 52 includes digital to analog converter 100, current amplifier 102, servo motor 104 and shaft encoder 106. Position servo 54 includes digital to analog converter 110, current amplifier 112, servo motor 114 and shaft encoder 116. Position servo 56 includes digital to analog converter 120, current amplifier 122, servo motor 124 and shaft encoder 126.

At this time it should be noted that the four motor/encoders are model CM325-2048-NAW-2 motor/encoders commercially available from Computer Optical Products of Chatsworth, Calif. The integral shaft optical encoders 96, 106, 116 and 126 provide 2048 counts/per revolution of the motor's shaft with quadrature sinewave output signals and an index pulse. The optical encoder is specifically designed to be used as a continuous feedback device in servo loop applications.

The servo motors 94, 104, 114 and 124 rotate in both the clockwise and counterclockwise direction. Rotation of the servo motors 94, 104, 114 and 124 respectively rotates the capstans 24, 26, 27 and 28. This, in turn, results in a constant adjustment of the length of each of the braided lines 30, 32, 34 and 36 causing rotational movement of gimballed mirror 22 around ball joint 28. The servo motors 94, 104, 114 and 124 in combination with capstans 24, 26, 27 and 28 and braided lines 30, 32, 34 and 36 steer gimballed mirror 38.

The feedback control loop is provided by the digital signal processing unit 80 which may a digital computer. The control loop compensation is implemented in digital algorithms. The four capstan angle commands (capstan angle 1, capstan angle 2, capstan angle 3 and capstan angle 4) are supplied to each of the digital to analog converters 90, 100, 110 and 120 from computer 80 via a multiplexed data bus 125. The shaft encoders and the servo motors can be low cost. The large capstan shaft angles required by the combination of the gimballed mirror 22 and capstans 24, 26, 27 and 28 allow motors 50, 52, 54 and 56 which have minimal torque requirement and a small number of poles to be used. This type of motor is generally of a lower cost than the pancake torque motor required on conventional gimbal systems.

The four kevlar lines or cables 30, 32, 34 and 36 are arranged in a symmetrical pattern. Since motor torque is directly proportional to motor current, cable tension is controlled in a control loop which keeps the total motor current constant over a long time constant.

Referring now to FIGS. 1, 2, 5 and 6, there is no mechanical elevation and azimuth axis in the ball joint gimbal system 20. The gimballed mirror 22 is free to move generally in any direction. Vertical motion and horizontal motion are nodes that exist only in a digital computer control system 130 which reside in computer 80. A plurality of gimbal drive signals/commands are presented to system 130 in reference to the vertical and horizontal axes of the missile's seeker body. These signals/commands are summed by a pair of summers 134 and 142 into a composite azimuth gimbal position signal/command and elevation gimbal position signal/command. The signals provided to summer 134 include (1) an azimuth step signal which is filtered by a filter 132; (2) an azimuth joystick signal (a gimbal steering signal); and (3) an azimuth track signal which is summed with a azimuth rate signal and then integrated by an integrator 138 prior to being supplied to summer 134. In a like manner, the signals provided to summer 142 include (1) an elevation step signal which is filtered by a filter 140; (2) an elevation joystick signal (a gimbal steering signal); and (3) an elevation track signal which is summed with a elevation rate signal and then integrated by an integrator 145 prior to being supplied to summer 142.

A matrix vector calculation is then performed by the digital computer 80 to determine the required position of the four cable ends of cables 30, 32, 34 and 36 with respect to the center of gimbal ball 23 (block 144). The vector positions of the pulleys 58, 60, 62 and 64 with respect to the center of gimbal ball 23 is known (block 148). A vector matrix sum is then performed by digital computer 80 to determine the required length of each cable 30, 32, 34 and 36 from its associated capstan 24, 26, 27 or 28 to the gimballed mirror 22 (block 146). The change in cable lengths of cables 30, 32, 34 and 36 required is next computed by subtracting (block 152) the cable lengths at boresight that were determined in the initialization sequence at start up (block 150). Each cable length change is converted to capstan angle change by dividing the cable length by the capstan radius (block 156). These capstan angle signals are then supplied to the four position servos 50, 52, 54 and 56. This is a repetitive process with the calculation being made 300 time per second.

As the gimballed mirror 22 is moved errors will occur in the capstan angle calculations due to errors in the components of unit 20 such as individual capstan diameter, pulley concentricity, etc. These errors are continuously accounted for by a cable tension loop. Small symmetrical capstan angle adjustments are made by an algorithm which keep all four lines 30, 32, 34 and 36 in constant equal tension.

Stabilization of the target line of sight vector 38 with respect to inertial space is also provided. Three rate gyros consisting of pitch gyro 70, yaw gyro 72 and roll gyro 74 are affixed to the missile's seeker body. These gyros 70, 72 and 74 operate as the rate transducers associated with the inertial navigation unit or autopilot of the missile. These gyros 70, 72 and 74 therefore not be a cost factor. The three orthogonal body rate signals from gyros 70, 72 and 74 are multiplexed by a multiplexer 76 and supplied to the central processing unit 80. Central processing unit 80 calculates the body rate vector with respect to inertial space.

The missile's seeker has the mirror line of sight vector with respect to the body. It is computed as the vector which bisects the angle between the target line of sight vector 38 and a vector from the gimballed mirror 22 to the fixed mirror 44. The mirror line of sight vector is differentiated and coordinate transformed to establish the azimuth and elevation mirror line of sight rates with respect to the seeker body as a function of the body rates with respect to inertial space. The azimuth rate and elevation rate signals are supplied to the mirror controller. When the seeker body undergoes pitch or yaw rotation the controller moves the gimballed mirror 22 the appropriate amount to keep the target image stationary on the imager 40. The mirror controller includes those elements which move the gimballed mirror 22 such as angular position servos 50, 52, 54 and 56; their associated servo driven capstans 24, 26, 27 and 28; and kevlar lines 30, 32, 34 and 36.

Referring to FIGS. 1, 2, 7, 8 and 10, ball joint gimballed system 20 comprises four independently controlled servo systems coupled only through the lines 30, 32, 34 and 36 to a common inertial load, the gimballed mirror 22. These four servo system function to precisely position the gimballed mirror 22 in pitch, yaw, and roll coordinates, and also to maintain roughly equal tension in the four kevlar lines 30, 32, 34 and 36, which draw the gimballed mirror 22 back against the ball joint 23.

The position control of the mirror 22 is accomplished using a vector transformation of the mirror 22 normal at the proper pointing angles in yaw and pitch to four "string vectors." These four vectors have magnitudes that are the required length of each of the four kevlar lines 30, 32, 34 and 36 to achieve the correct pointing angle of the mirror 22 and certain directional components. These directional components lay in the direction of the kevlar lines 30, 32, 34 and 36 tensioned between the mirror attachment points and their respective capstans 24, 26, 27 and 28 mounted on the motor shafts of motors 94, 104, 114 and 124. By transforming the gimballed mirror yaw, pitch, roll commands to line length commands, the complex technique required to position gimballed mirror 22 is reduced to four single-axis control loops. These four loops function as if the loops are tightly coupled in order to generate a predictable trajectory as mirror 22 is stepped from one position to another. Requirements exist for the following functions: (1) the tension for lines 30, 32, 34 and 36 must be maintained precisely during movement of the mirror 22 so that no line is slack at any time, (2) the gimballed mirror normal must be precisely controlled by the length of the four servo systems, and (3) the force component of mirror 22 acting against ball 23 must be directed along the axis of the post of support structure 25 supporting ball 23.

To satisfying these requirements a control system is needed that is sufficient to meet the requirements for positioning accuracy in the presence of static friction of ball 23 acting on the ball socket attached to the back side of mirror 22, while simultaneously avoiding non-linearities; e.g., saturation, which would cause a loss of coordination during movement. Saturation in any axis or axes will result in line slacking, which is an immediate indication that the position of the mirror normal is incorrect. Additionally, rapid retensioning following a slack condition causes dynamic loading of the kevlar lines 30, 32, 34 and 36, which will break or fray the lines 30, 32, 34 and/or 36. Smooth, coordinated motion between the four servo systems is essential to reliable, accurate positioning of mirror 22.

The design criteria that were utilized during development of the positioning servos are (1) acceleration will not be commanded that will cause a preset current limit to be exceeded, and (2) velocity will not be commanded that will cause the back EMF of the motors 94, 104, 114 and 124 to exceed the maximum voltage capability of the outputs of servo amplifier 92, 102, 112 and 122. The simultaneous application of these requirements to each of the four independent line servo systems since a command modification or filtering needs to be applied to the pitch and yaw commands before the transformation to line length commands.

A proximal time optimal servo (PTOS) technique implements filtering of the pitch and yaw commands. The PTOS technique achieved a time optimal response for arbitrarily large step changes in angle without sacrificing small signal bandwidth. PTOS parameters were calculated for all variants of the seeker configurations.

The PTOS technique is used because the technique permits commanding mirror angles to step between two positions within a time optimal fashion. PTOS limits the acceleration of these commands so that current limits will never be exceeded regardless of the servo error, thus eliminating the ambiguity of control between the four line servo systems. Control is possible because the nonlinear nature of the error signal processing within the PTOS function enables the sign of the error signal to reverse in sufficient time to decelerate the inertia of the load to zero. The rational for this approach is that PTOS is independent of the velocity at reversal; i.e., at high velocities error signal reversal occurs further away from the commanded position than it would for low velocities, thus "adapting" for the extra time needed to decelerate the load at the maximum acceleration possible without saturating the control system.

Figure 7:
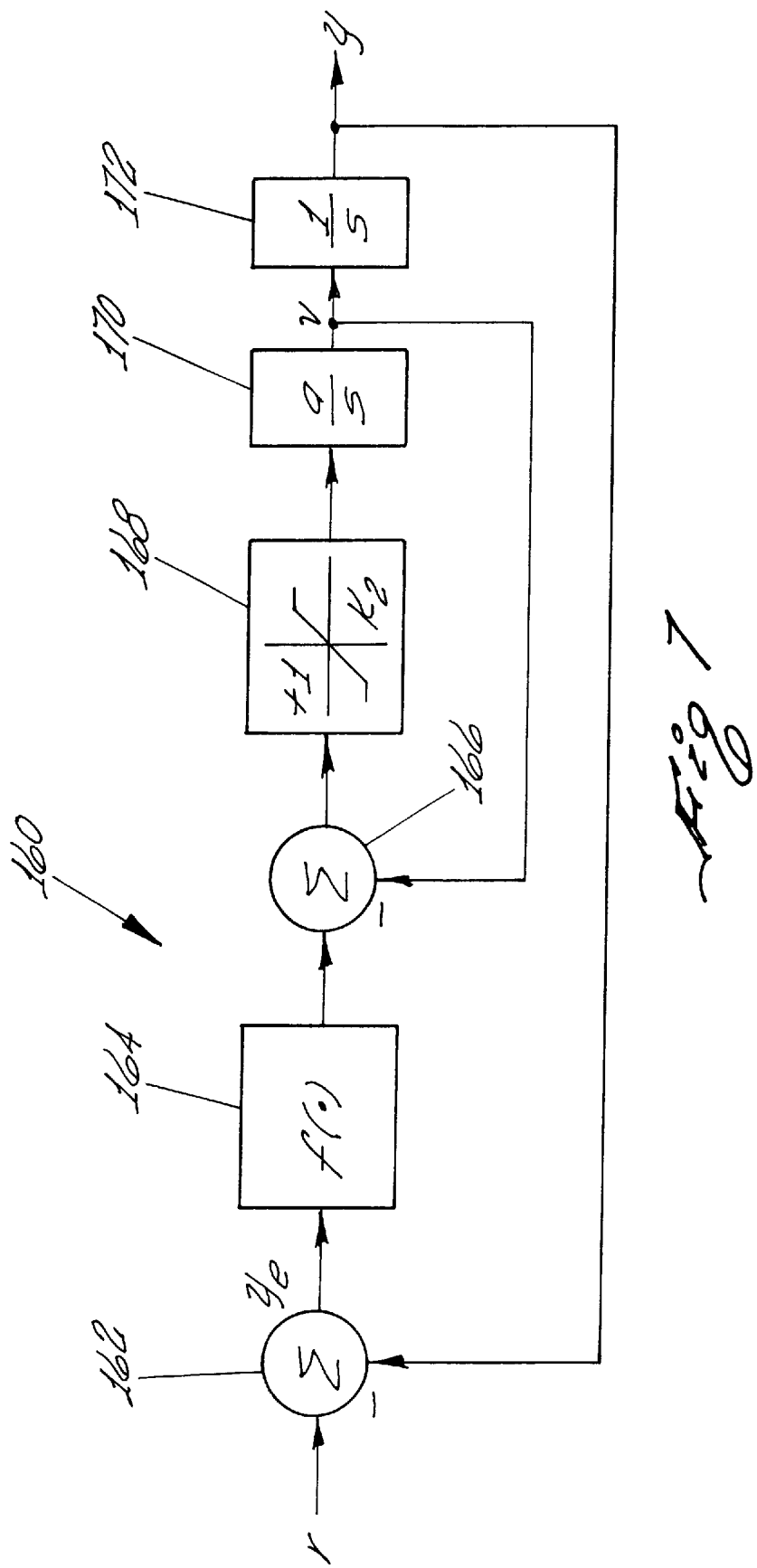
FIG. 7 is a proximal time optimal servo diagram to implement filtering of the pitch and yaw commands from the missile's body rate sensors.

FIG. 7 shows a double integrator system configured for PTOS by implementing the following equations:

$$\dot{y} = v_1 \quad (1)$$

$$\dot{v} = a \cdot \text{sat}\{k_2[f(y_c) - v]\} \quad (2)$$

The saturation function 164 (FIG. 3) is expressed in the following equation:

$$f(y_e) = \begin{cases} \frac{k_1}{k_2}(y_e), & |y_e| \le y_1 \\ \text{sgn}(y_c)\left[(2a\alpha|y_e|)^{\frac{1}{2}} - \frac{1}{k_2}\right], & |y_e| > y_1 \end{cases} \quad (3)$$

where
- a is the maximum acceleration allowed
- α is the acceleration discount factor (0<α<1) to accommodate uncertainty in the plant acceleration
- $y_1$ is the size of the linear operating region For f($y_c$) to remain continuous in the boundaries of the linear range $y_1$, $k_1$ and $k_2$ are constrained as follows:
  edrnrnposssibleconsistantstabolizєgprescence-ABTSRACTrcapstaink and $$k_1 = \frac{1}{y_1} \quad (5)$$

The maximum acceleration and the linear operating regions are found by system measurements and the acceleration discount is selected by measuring current waveforms during peak accelerations under worst case loading conditions.

Figure 8:
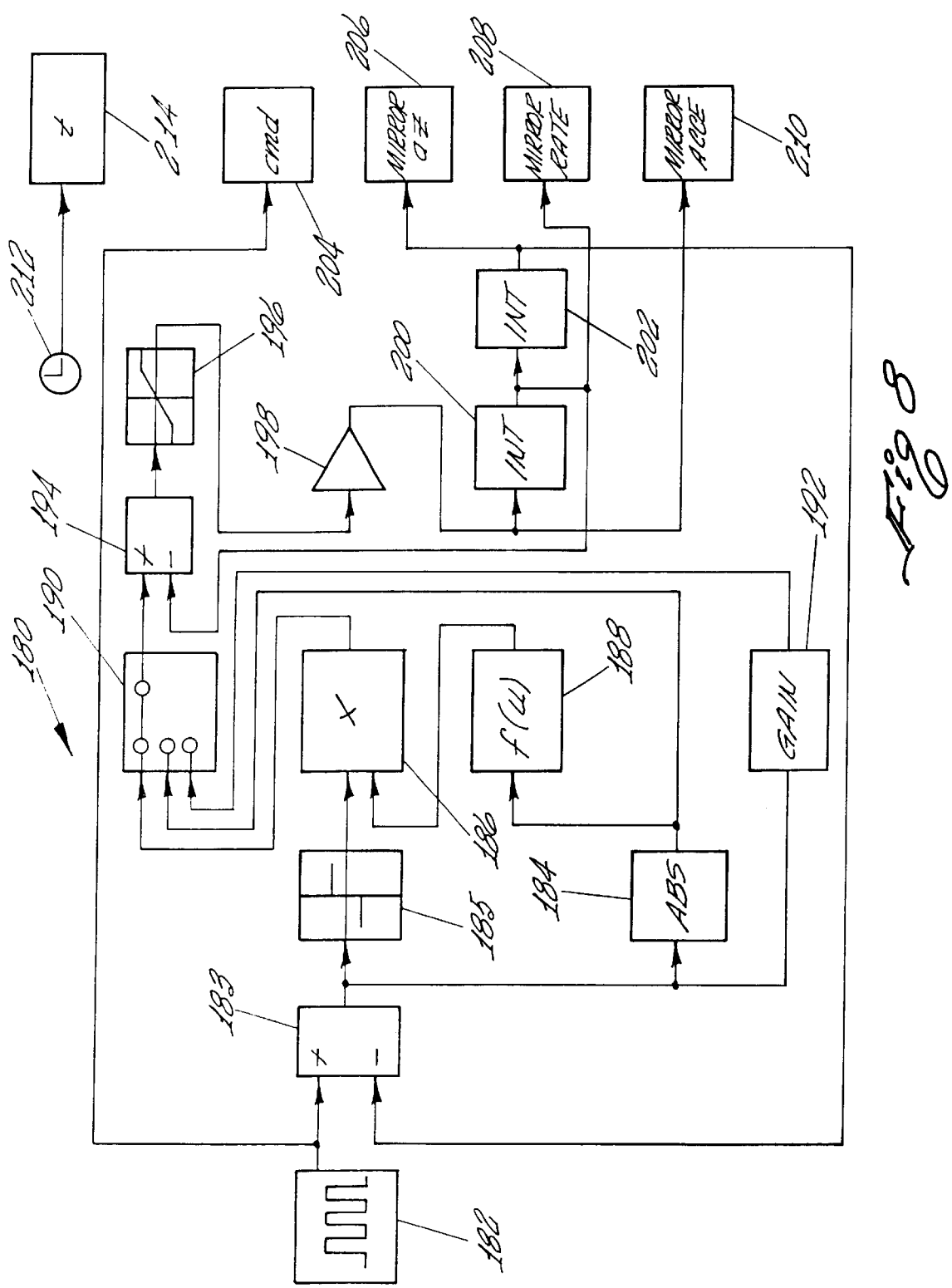
FIGS. 8 and 9 are block diagrams of the four ball joint gimbal line servos.

FIG. 8 is a model of a PTOS system implemented in the four line servos of ball joint gimballed system 20. The ball joint gimbal application requires one more enhancement to the proximal time optimal servo system. In a normal proximal time optimal servo system, a second order, double integrator plant is a part of the servomechanism "physical plant." In the ball joint gimbal system 20, this is not possible because the "physical plant" comprises the four independent line servos 30, 32, 34 and 36 and the command processing must be applied to the mirror position commands in two axis coordinates prior to their resolution into the four line servo commands. The ball joint gimbal system servos are implemented with a two-axis "model follower" approach; i.e., the double integrator part of the plant is implemented analytically in ball joint gimbal system operational software and modified mirror commands in the yaw and pitch axes are transformed into the four line length commands. Velocity and acceleration controls are applied via the proximal time optimal servo to the mirror commands such that the torque/speed limits are never exceeded in any of the four line servos. The servos thus follow the output of the plant model represented by the two analytic integrators which are integrators 200 and 202 depicted in FIG. 8.

The proximal time optimal servo system, as implemented for the ball joint gimbal system 20, is useful in shaping the command for large, discontinuous (step) commands, which without some form of command filtering, are a source of line breakage, line "whipping," loss of seating force between the mirror socket against the ball, and a geometrically uncoordinated move by the mirror in response to saturation in one or more of the line servos. The PTOS technique produces an "S" trajectory when moving the mirror between discrete positions with no discontinuities in the position-time trajectory and controllable accelerations and velocities, which are well within-the current limits and rate limits of the four servo lines.

Figure 9:
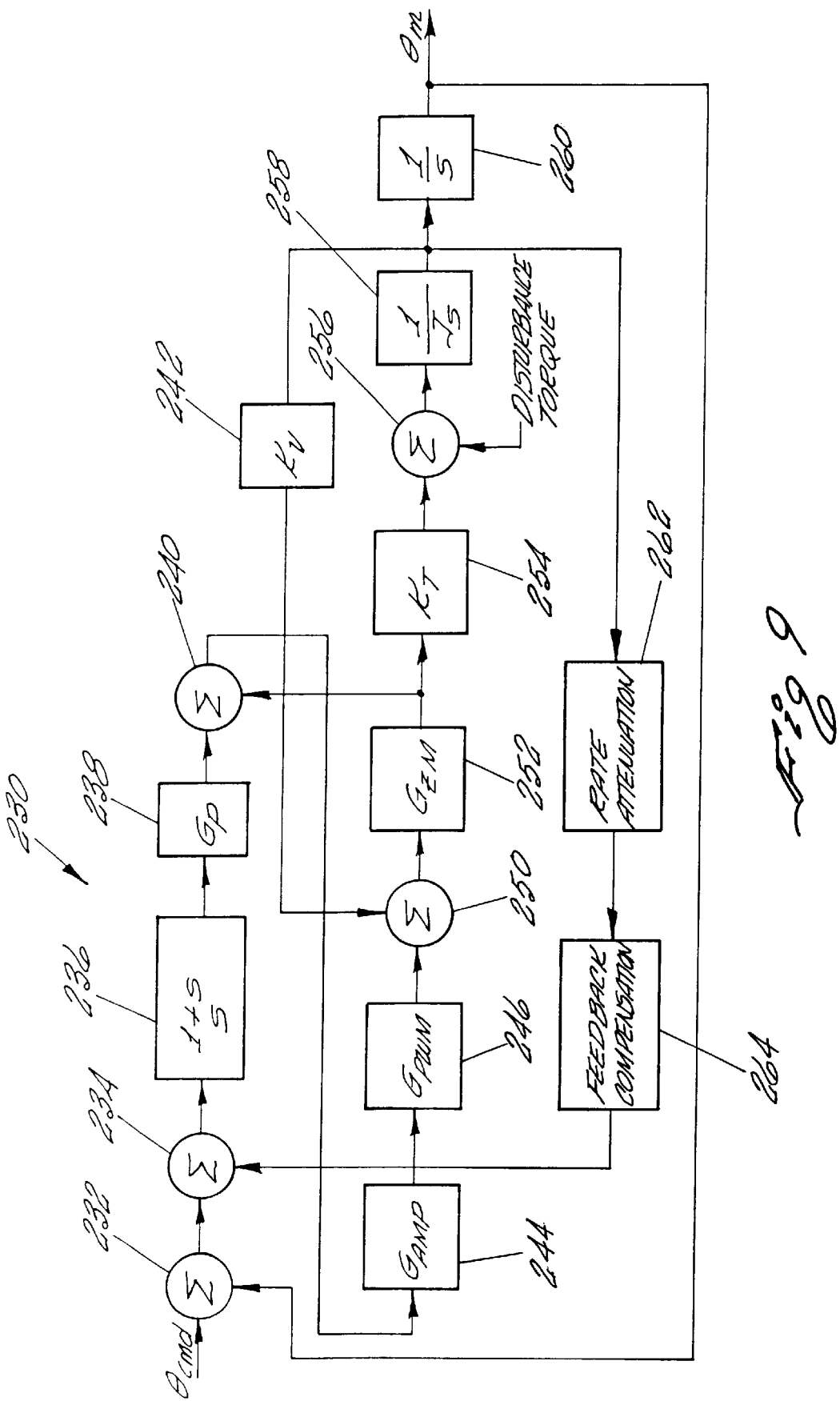

Referring to FIG. 9, using feedback to reduce the coupling of torque disturbances, which are summed to the right of Motor Torque Constant block 254, is most effective when the feedback originates to the "right" of the summation 256. It was determined that the motor rate signal, derived from the first difference of motor position, can be used to shape the loop gain curves to achieve a enhanced torque disturbance rejection. Superior torque disturbance rejection is obtained when the gain bandwidth product is maximized and the feedback does not depreciate that loop gain at higher frequencies. The rate feedback signal supplied to rate attenuator 262 is obtained from the shaft encoder 96, 106, 116 or 126 on each of the line servo motors 94, 104, 114 and 124. The encoder reading is differenced on successive samples to synthesize the shaft rate. The magnitude of this rate is attenuated by 1/600 to stabilize the loop for unity gain crossover at 1000 radians per second (rad/sec (about 160 Hz)).

The integral lead/lag compensator 236 is retained for low frequency gain, but the lead break frequency is lowered to 1 rad/sec. The effect of this compensation is diminished at 1 rad/sec.

The coupling of torque disturbance at summer 256 is generally as small of a value as possible consistent with feedback loop design. This provides for a reduced dynamic following error in mirror pointing while stabilizing the line of sight in the presence of missile body motion.

Figure 10:
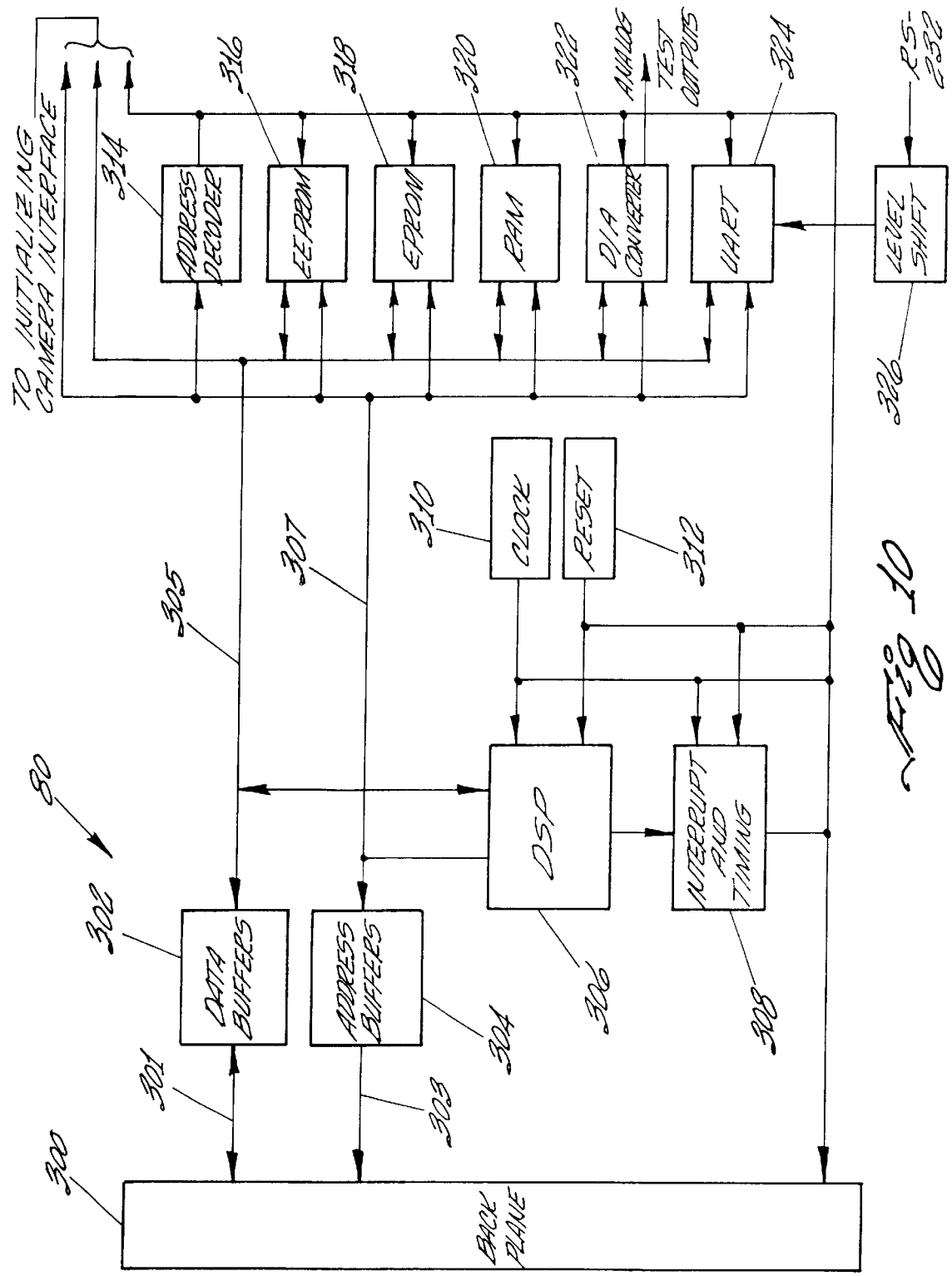
FIG. 10 is a block diagram of the central processing unit used in the ball joint gimbal system of FIG. 1.

Referring now to FIG. 10, the digital signal processing unit 80 for the ball joint gimballed system 20 of FIGS. 1 and 2 includes the 32 bit TMS320C31 digital signal processor 306 commercially available from Texas Instruments of Dallas, Tex. Processor 306 is clocked by a 48 megahertz clock 310 and has an operational capability of 24 million instructions per second and 48 million floating point operations per second. Processor 306 also has 2 k words of static RAM and 24 address lines which allow it to access 16 million words of program data and I/O space. The address lines for digital signal processor 306 feed an address decoder 314 to generate the chip select signals for the electronic elements of FIG. 10. The address decoder 314 breaks a 16M address range into 33 blocks of various address bit lengths. Processor 306 is also connected to an interrupt and timing generator 308 which generates additional control signals and interrupt timing signals.

RAM 320 includes 32 k words of external static RAM. On power up, code is transferred from the 128 kB program EEPROM memory 318 to the static RAM 320 and program execution is transferred from a boot loader to the newly loaded program. An 8-k block of non-volatile memory 316 is also included within digital signal processing unit 80 and is used to store system dependent information, such as mirror position correction maps and initialization camera values. A UART (universal asynchronous receiver transmitter) 324 is included within unit 80 to allow for RS-232 communications.

A four channel digital-to analog converter 322 is included within unit 80 and is used for testing to observe internal variables of the processor in real-time. For example, the user could output the encoder position of one of the four capstans 24, 26, 27 or 28 and then feed the output to a network analyzer to make bandwidth measurements of the control loop.

The 32 bit bi-directional data buffers 302 transmit data to and receive data from back plane 300 via an external data bus 301 while address information is transmitted from the 12 bit address buffers to the back plane via an external address bus 303. Data bus 305 allows for the internal transmission of data between the components of digital signal processing unit 80 while the internal transmission of address information within digital signal processing unit 80 occurs via an address bus 307.

Referring now to FIGS. 1, 2, 3, 4, 10, 11 and 12, ball joint gimbal system 20 includes a line of sight stabilization process for gimballed mirror 22. The low inertia of gimballed mirror 22 and the geared down mechanical advantage of the four kevlar lines 30, 32, 34 and 36 wrapped around the four servo driven capstans 24, 26, 27 and 28 results in an extremely accurate and fast scanning optical pointing system. Inertial gimbal stabilization of the optical line of sight (depicted by vector 38) is accomplished by a feed-forward remote stabilization algorithm utilizing body rate information from a body-fixed inertial measurement unit (IMU). The body-fixed inertial measurement unit is a component of a missile system which provides autopilot and navigation functions.

In the preferred embodiment, a Litton LN200 inertial measurement unit (IMU) was used to stabilize the feed-forward image. The LN200 inertial measurement unit uses a serial SDLC data format for sending rate data, which was received and decoded by an Intel 8744 micro-controller. Once the entire data packet is received from the LN200 inertial measurement unit, which includes roll, pitch, and yaw rates, the 8744 micro-controller stored the data in a dual-port memory and generated an interrupt for digital signal processor 306 of system.

Two versions of the LN200 inertial measurement unit, one operating at a 2000 Hz data rate and the other operating at a 3600 Hz data rate, have been used successfully integrated with ball joint gimbal system 20. When the ball joint gimbal system 20 digital signal processor 306 receives the interrupt, it executes a subroutine c intO2, which then fetches the rate data from the dual-port memory and scales the data to radians per second. Digital signal processor 306 then multiplies the data by a calibration matrix to align the inertial measurement unit data with ball joint gimbal bulkhead coordinates. The data is then stored and made available for use by other subroutines.

To reduce production cost on the ball joint gimbal system 20, system 20 was designed to not require tight tolerances during mechanical fabrication and assembly. However, for ball joint gimbal system 20, these mechanical tolerances resulted in uncertainties in the location of the line terminus points of the four kevlar lines 30, 32, 34 and 36, capstan diameter of the servo driven capstans 24, 26, 27 and 28 and pitch, and mirror post 25 location. This results in a pointing error in the movable mirror 22. These pointing errors are repeatable, and therefore, can be measured and compensated for within ball joint gimbal system 20.

To align the gimbal and to measure the system 20 pointing errors, a precision reference comprising a rate table with 19-bit-encoder accuracy was utilized. The table has two degrees of motion, yaw and roll, and is controlled via an RS-232 interface from a personal computer. After the ball joint gimbal system 20 was mounted on the table, the mirror post 25 and ball 23 were centered on the roll and yaw axes of the table through the use of a dial indicator and mechanical adjustment screws on the table. This adjustment eliminated any translation effects on the mirror 22 as the table was moved in roll and yaw. Next, the table's roll axis tilt was adjusted to ensure orthoganality with the yaw axis. This was accomplished by reflecting a laser off a mirror mounted on the back of the roll axis and adjusting the mirror until there was no motion detected in the reflected beam as the table rolled ±180 degrees indicating that the mirror's reflective surface was perpendicular to the roll axis. The test was then repeated by moving the table's yaw axis exactly 180 degrees and reflecting the laser off a mirror mounted on the front of the roll axis. This mirror was also adjusted until the mirror was orthogonal with the roll axis. Finally, the tilt of the roll axis was adjusted until the reflected beams from the front and back mirrors fell on the same spot, indicating the roll axis was perpendicular to the yaw axis.

The direction "up" is arbitrary to the gimbal mirror 22 and is initially defined as 0.0 degrees in the table's roll axis. When there is a requirement for "up" to be at a specific orientation, a calibration mirror or mechanical alignment is utilized. An inertial measurement unit is permanently mounted to the gimbal's bulkhead and is aligned with the table's axis mathematically using a transformation matrix, derived by moving the table in yaw and roll and measuring the inertial measurement unit's rate outputs.

System 20 is powered up and its mirror 22 adjusted to be perpendicular to the roll axis. This is defined as the caged position for mirror 20 and is used as the reference position for any commanded gimbal angle. The caged position for mirror 22 can be accurately repeated at any time through the use of initialization cameras. An autocollimator is pointed at the mirror 22 and the autocollimator's readings zeroed out. The autocollimator is used to measure the pointing error of the mirror to within ±50 microradian and is equipped with an analog output for pitch and yaw proportional to the measured error. Software written to run on a Personal Computer is executed to command the mirror 22 to every possible position in its field of view in 50 mrad steps. At each position, the table's yaw and roll axis is positioned such that the autocollimator reads zero error if the mirror 22 is positioned correctly. This is accomplished by calculating the normal to a theoretical perfectly positioned mirror and moving the table such that the normal vector is pointing directly at the autocollimator. The pointing equations for the table are as follows:

Find the mirror normal vector:

$$X\_NRML=\cos(\text{mirror pitch command})\cdot\cos(\text{mirror yaw command}) \quad (6)$$

$$Y\_NRML=-\sin(\text{mirror yaw command})\cdot\cos(\text{mirror pitch command}) \quad (7)$$

$$Z\_NRML=-\sin(\text{mirror pitch command}) \quad (8)$$

Because the table does not have a pitch axis, the roll angle is computed to put the normal vector entirely in the yaw plane:

$$\text{Table Roll}=-\arctan(Z\_NRML/Y\_NORML) \quad (9)$$

The table yaw is then computed to bring the vector to 0.0 degrees:

Table Yaw=−arc tan(Y-NRML/X-NRML)/cos(Table Roll)    (10)

Since the mirror 22 is not positioned perfectly, the autocollimator indicates an error. This error is sent to the digital signal processing unit 80, which, in turn, moves the mirror 22 until the error reaches zero in both pitch and yaw. This calibrated position is then stored and the gimbal and table continue onto the next position.

For ball joint gimbal system 20, 247 points need to be measured to cover the entire ±450 Mrad yaw, +550/−50 Mrad Pitch field of view of system 20. This data is stored in an array contained in non-volatile memory 316 within digital signal processing unit 80. The mapping process is automated and takes about 2 hours to complete. In addition to storing the calibrated mirror pitch and yaw positions for mirror 22 within digital signal processing unit 80, the four capstan encoder values for capstans 24, 26, 27 and 28 are also stored in central processing unit 80 and can be used to position mirror 22, if desired.

The use of this stored data is as follows. During the normal operation of ball joint gimbal system 20, when a mirror position command is generated, the pitch and yaw commands are used as indexes into a two-dimensional array containing the calibrated pitch and yaw position values for mirror 22. The calibrated values are then used to position mirror 22. For pitch and yaw commands that fall between the 50 mrad resolution of the array, two-dimensional linear interpolation is used to derive a calibrated pitch and yaw value. Before error calibration, mirror-positioning errors were as high as 30-mrad peak. This is reduced to less than 2-mrad peak with an average error of 200–300 microradian.

The function of pointing the gimbal requires navigation inputs from a C-MIGITS II integrated GPS/INS system manufactured by Boeing of Seattle, Washington, and a surveyed target coordinate. The C-MIGITS II integrated GPS/INS system is comprised of two basic elements: a Digital Quartz inertial measurement unit (IMU) and a Micro Tracker LP GPS nine-channel receiver. In normal operation, a three-dimensional navigation solution, including attitude and heading, is computed based on integrated inertial data. The accuracy of the C-MIGITS II integrated GPS/INS system integrated GPS/INS system is limited by a GPS Ll CIA code error model, which is approximately 36 meters. This accuracy is adequate to place the surveyed target within the field of view of a missile seeker. The surveyed target location is given in latitude, longitude, and elevation.

A graphical user interface (GUI) program was written for a flight operator to be able to select a target, and to command the gimbal to point at the target. The pointing calculation is incorporated into the GUI program and takes place on personal computer. The three-dimensional navigation solution from the C-MIGITS II integrated GPS/INS system and the surveyed target are transformed through a series of navigation equations and then translated into a mirror command that controls the gimbal mirror 22 to point at the designated target.

An operator is shown a target selection with coordinates, the aircraft's navigational solution, and the gimbal mirror 22 command angles. The selected target location is also shown to the operator. This allows the operator to have a visual sense of when the target is within the field of view of mirror 22, and the mechanical limits for the gimbal mirror 22. Once the target is within a green zone, a pointing mirror command is sent from the Personal Computer to the ball joint gimbal system 20.

There is also a capability within the graphical user interface to select multiple targets and to point toward multiple targets in series. This graphical user window controls which targets to point toward. The interface will command the gimbal to point to-a selected target when it is within the field of view of gimbal mirror 20, and dwell on this target for a specified dwell time period before pointing to the next available target.

The C-MIGITS II integrated GPS/INS system and the missile bulk head inertial measurement unit (IMU) are aligned mechanically or through software. The tested implementation uses the software alignment process (illustrated in FIGS. 11 and 12) by tracking on a surveyed/selected target. By comparing the two navigation solutions from the C-MIGITS II integrated GPS/INS system and the missile bulk head inertial measurement unit, a known bias is recorded.

Referring to FIGS. 1–4 and 13–20, operating the ball joint gimbal system 20 requires precisely controlling the length of four kevlar lines 30, 32, 34 and 36 via the positioning of four capstan motor encoder assemblies/position servos 50, 52, 54 and 56. Image stabilization requires running a set of algorithms to monitor IMU rates from the C-MIGITS II integrated GPS/INS system and the missile bulk head inertial measurement unit and then compute the required mirror position for mirror 22 to maintain a stable LOS vector 38. In addition, a host of other functions must be accomplished, including communications, mode switching, fail safe monitoring, and command shaping. All of this must be completed at an inner loop control rate of 2400 Hz to maintain acceptable gimbal performance. This work is accomplished by a single Texas Instruments TMS320C31 DSP chip 306, which contains a 32-bit floating-point processor running at 48 MHz. The processor 306 was programmed with 2800 lines of C code using the Texas Instruments C compiler and debugger. Reference is made to the flow charts illustrated in FIGS. 13–20 for a description of the ball joint gimbal system control software.

Ball joint gimbal system 20 needs to be able to accept position commands or steering signals from an external source (e.g. joystick) and send back status information, such as mirror position and operating mode to an external host controller/computer. A parallel interface was utilized to accomplish this function because of its ease of implementation and high-speed, low-latency characteristics. This interface consists of a 32-bit-wide, 2048-word-deep, dual-port memory connected directly to data bus 300. The other side of the dual port memory is accessed via a 16-bit-wide differential bus that requires two data accesses to send and receive all 32 bits of data.

Hardware and variables are initialized during program steps 432 and 434. At power up, the digital signal processor 80 runs micro code that downloads the main program from EPROM 318 into high-speed static memory 320. Once this transfer is complete, execution of the main program begins by initializing the ball joint gimbal system 20, which includes configuring the hardware and setting up system variables and arrays. Next, each motor driver is instructed to find the encoder index pulse necessary for proper operation of the two-phase motors 94, 104, 114 and 124. Once all four motor drivers signal that the motor drivers are ready, the subroutine homesequence( ) (program step 434) is run, which slowly winds the four kevlar lines 30, 32, 34 and 36 onto the capstans 24, 26, 28 and 30 to remove any slack in the kevlar lines 30, 32, 34 and 36. When the lines 30, 32, 34 and 36 are under tension, mirror 22 is moved in such a way that each line 30, 32, 34 and 36 is unwound completely off its associated capstan 24, 26, 28 or 30 then the lines 30, 32, 34 and 36 are rewound. This ensures that the lines 30, 32, 34 and 36 lay correctly in the capstan grooves within each associated capstan 24, 26, 28 or 30. During this process, digital signal processor 80 also zeros the four shaft encoders 96, 106, 116 and 126 with respect to a known location via index marks contained on the encoder wheels. The digital signal processor 80 then uses the calibration values derived during the mapping process to bring mirror 22 to its bore-sight position.

Figure 11:
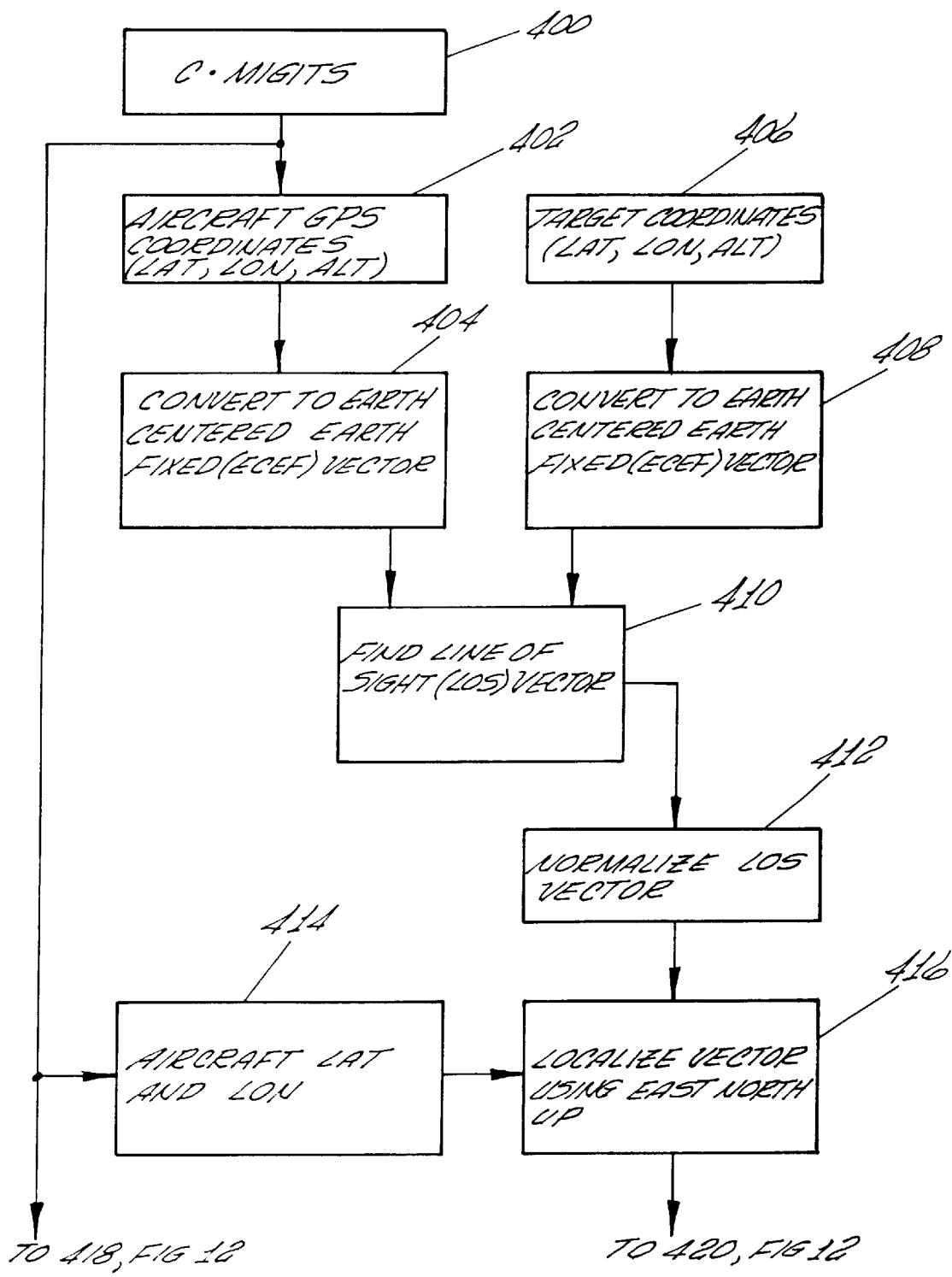
FIGS. 11 and 12 depict a computer software flow diagram for the gimbal pointing software used by the ball joint gimbal system of FIGS. 1 and 2.
Figure 12:
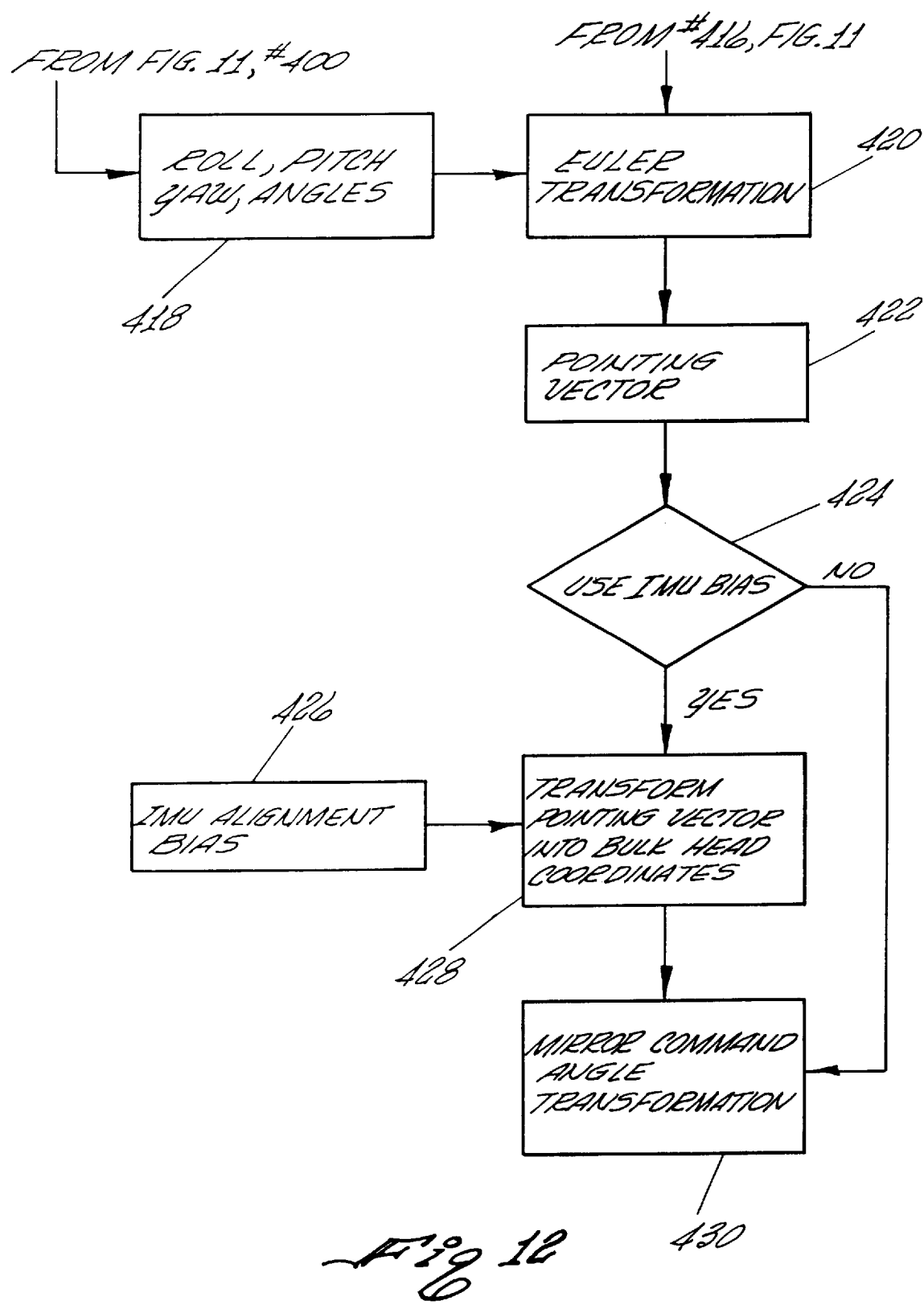

The control software for gimbal ball joint system 20 includes a mode control loop comprising the program steps illustrated in FIGS. 11 and 12. When the mirror is brought to its bore-sight position, a 2400-Hz inner loop begins monitoring and controlling the mirror's position and rate. The flow chart for this loop is illustrated in FIGS. 15–20 beginning at program step 460, FIG. 15.

In addition, a 300-Hz outer loop is continuously running to monitor user inputs and put the gimbal in various modes based on these inputs. These modes of operation include a cage mode (program step 440), a scan mode (program step 442), a step mode (program step 444), a map mode (program step 448) and a track mode (program step 452). This loop also outputs gimbal status to a dual port memory for interfacing with an external host controller/computer (program step 456).

The user inputs or steering signals are provided from one of two places. The first is a series of switches and a joystick for direct user control, and the second is a dual port memory that can be accessed by the external host controller/computer to interface with the gimbal mirror 22.

The gimbal modes include a joystick mode by which a user can drive or steer the mirror 22 with a joystick. The joystick position is read by an analog to digital converter scaled to radians/sec and fed to the 2400 Hz inner loop.

The gimbal modes also include a step mode (program step 444 and 446) during which mirror 22 rapidly steps between four adjustable positions. The positions are adjusted with the joystick and can be anywhere in the field of view for mirror 22. This is a demonstration mode to show the rapid stepping capability the gimbal mirror 22. The gimbal mirror 22 steps and settles in less than 30 milliseconds (ms).

The scan mode (program steps 442 and 443) is a demonstration mode within the gimbal modes. This subroutine puts gimbal mirror 22 in a preset high-speed scan that moves mirror 22, 7.5 degrees in 0.24 seconds, then retraces the scan in under 30 ms. The scan is repeated continuously until the scan mode is exited.

The track mode (program steps 452 and 454) enables a video tracker allowing an operator to select a target with the joystick by moving the gimbal mirror 22 until the desired target is in the center of a raster under its cross hairs. After selecting the target, system 20 is placed in the track mode and errors from the tracker are fed to the inner loop to close the loop around the gimbal mirror 22 and keep the target under the cross hairs.

The map mode is used after a gimbal mirror 22 is first assembled to measure and record the pointing errors of the mirror 22. When in this mode, the gimbal mirror 22 is commanded to various positions by a personal computer, which communicates to the gimbal through a dual-port memory. Once the mirror 22 is at the desired position, the personal computer instructs the gimbal mirror 22 to use the autocollimator error data to drive the mirror 22 until the error reaches zero. The autocollimator signals are fed to the gimbal through a multi-channel A/D converter.

The cage mode (program steps 438 and 440) drives mirror 22 to 0 radians in pitch and 0 radians which is referred to as the caged position. While in the cage mode, the user can optionally calibrate mirror 22 whereby a snapshot is taken with two CCD cameras located on each side of mirror 22. These cameras are pointed at tiny targets marked on the edge of the mirror 22 whose precise location was measured when the bore-sight position was set. A subroutine Zero Init Err( ) looks at the snapshot images that were stored in memory by a hardware frame grabber and determines the center of the targets within the image raster. This is accomplished by first thresholding the image to separate the dark target from the white background then running a centroid algorithm to find the target's center. The target's current location is then compared to the value it should be when the mirror 22 is bore sighted, and the mirror's position is adjusted accordingly.

While in the caged mode, the user also has the option of setting a new cage position. This should occur only when the gimbal is on the calibration table and the bore sight location can be measured with an autocollimator or other device. When a new bore-sight position is set using a joystick, the current absolute encoder values for encoders 96, 106, 116 and 126 are stored as the encoder bore sight values. These stored values are used when the gimbal is powered up and the homesquence( ) subroutine (program step 434) is run to bring mirror 434 to its initial bore-sight position. In addition, a subroutine Image_Scan( ) is run to determine the location of the calibration targets within the raster of each initialization camera. Finally, an instruction sets the current relative encoder values for encoders 96, 106, 116 and 126 to 0 signifying the bore-sight position.

Figure 13:
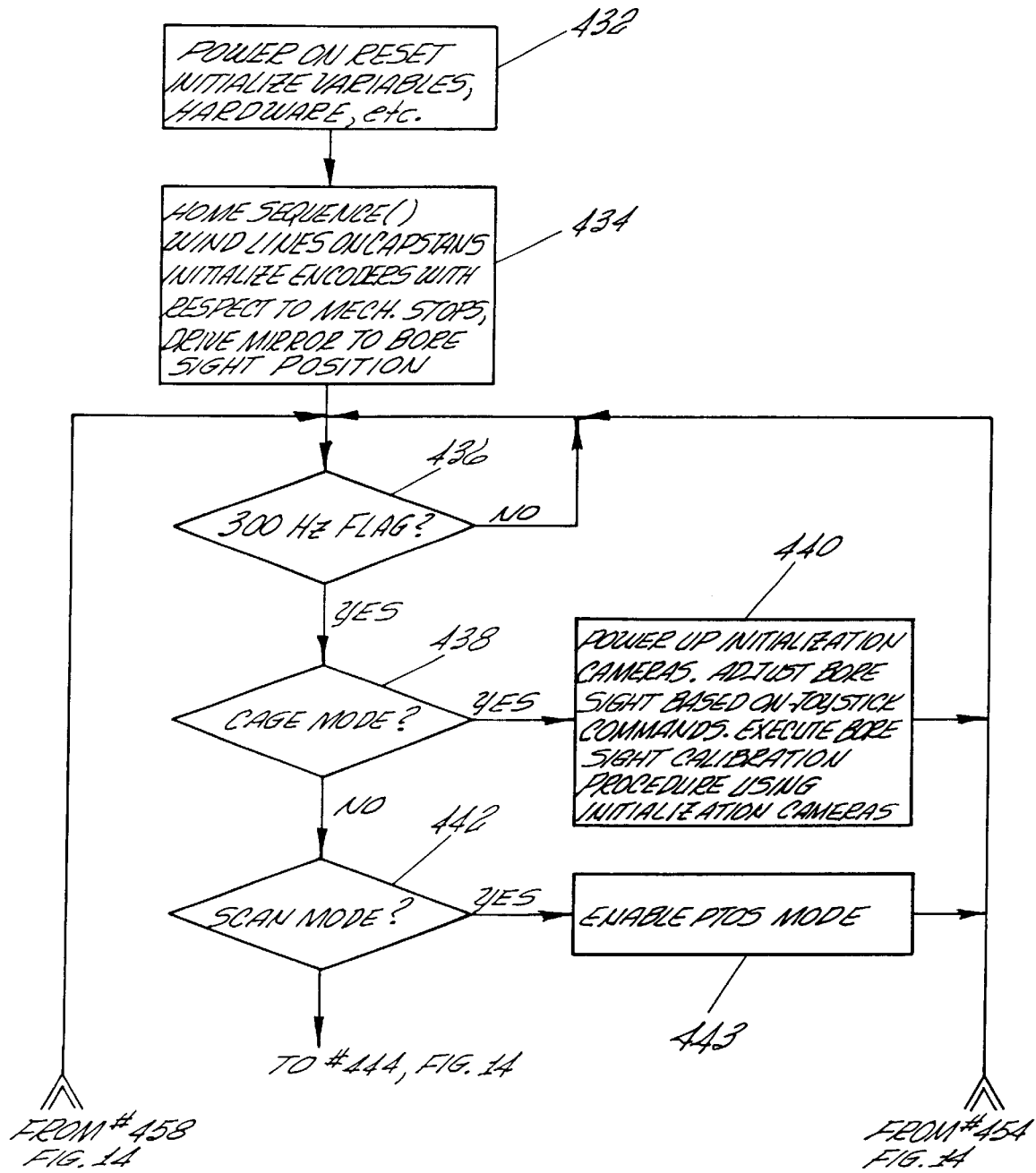
FIGS. 13 and 14 depict a computer software flow diagram for the mode control loop software used by the ball joint gimbal system of FIGS. 1 and 2.
Figure 14:
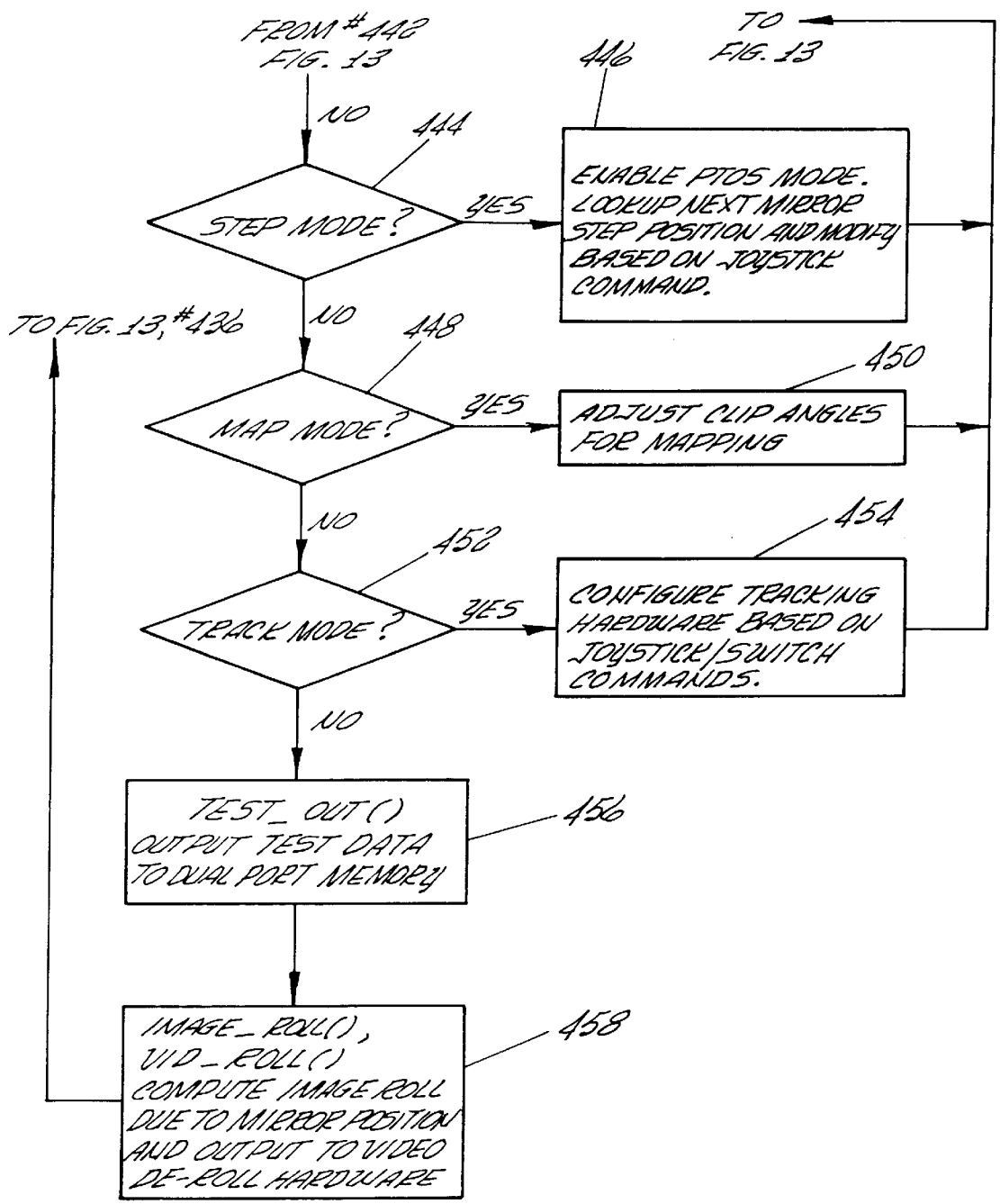
Figure 15:
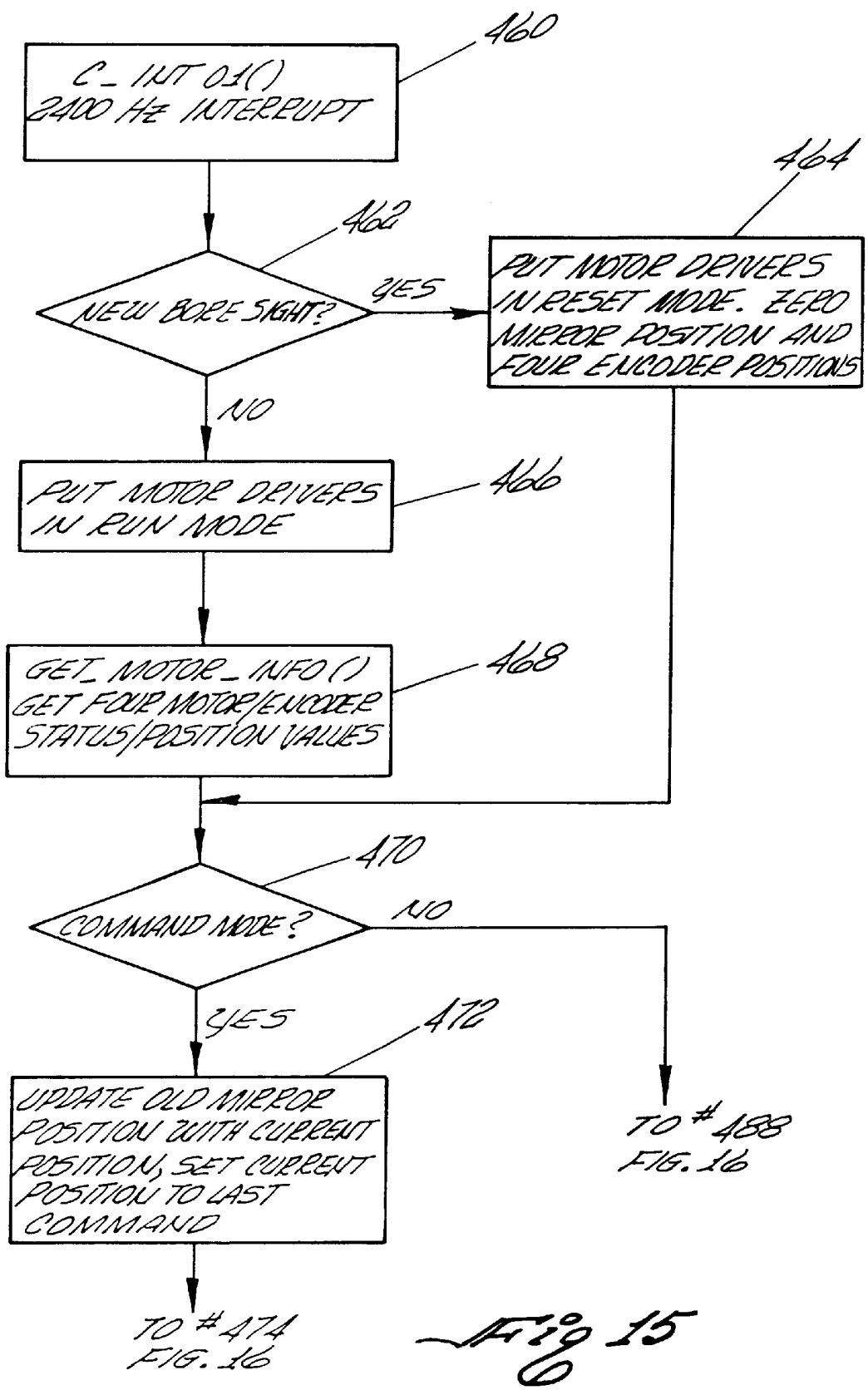
FIGS. 15–20 depict a computer software flow diagram for the position loop software used by the ball joint gimbal system of FIGS. 1 and 2.
Figure 16:
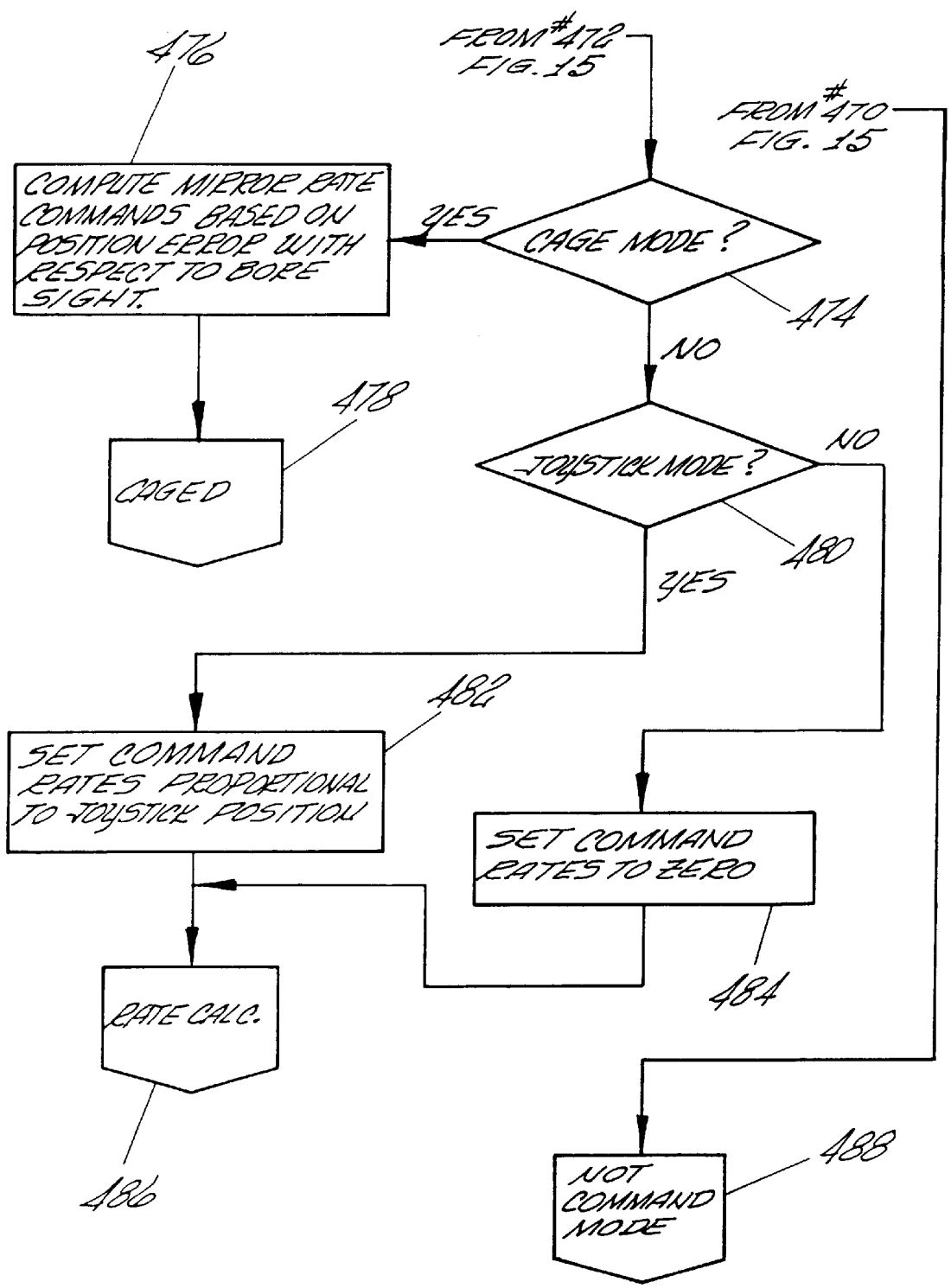
Figure 17:
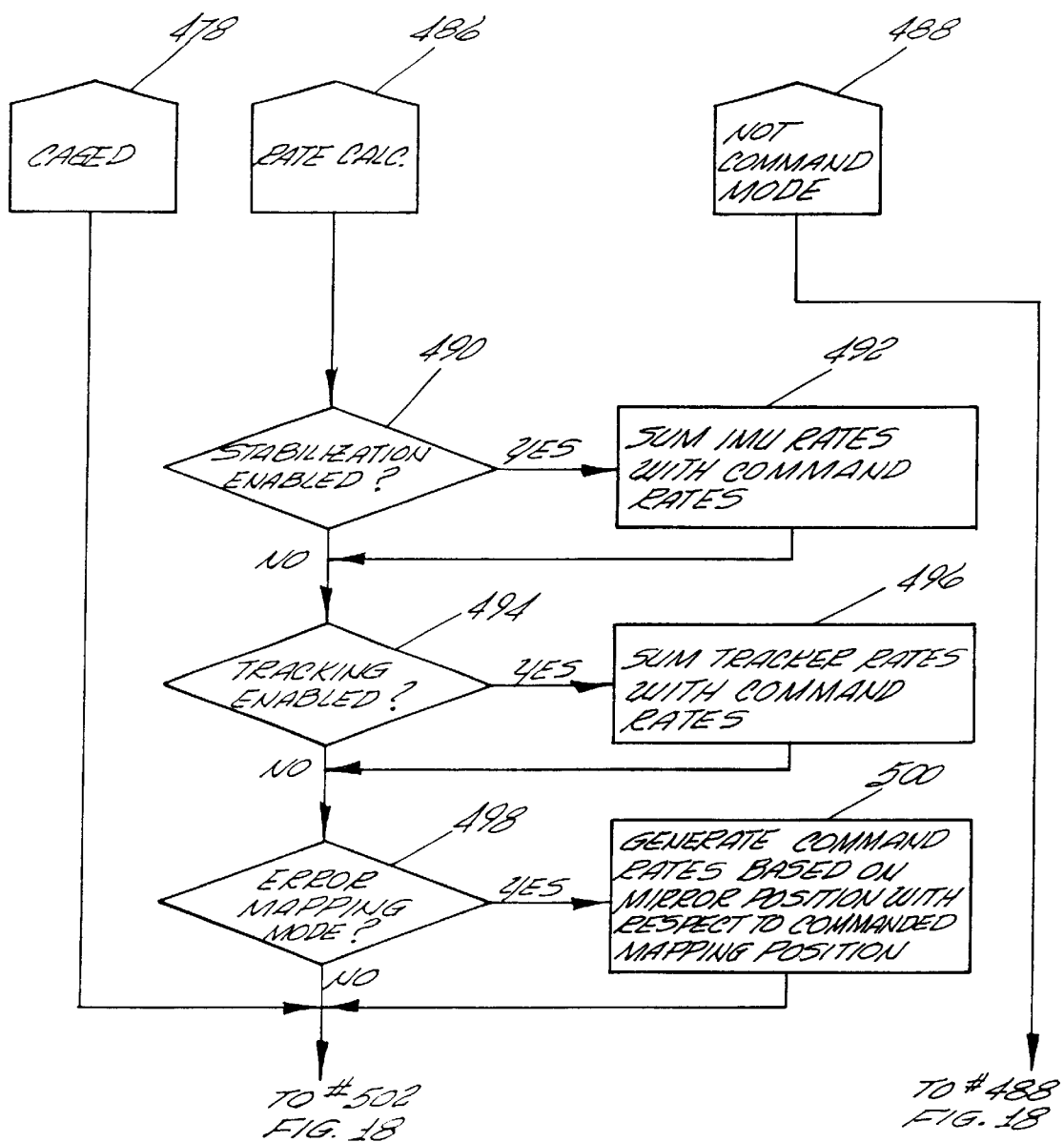
Figure 18:
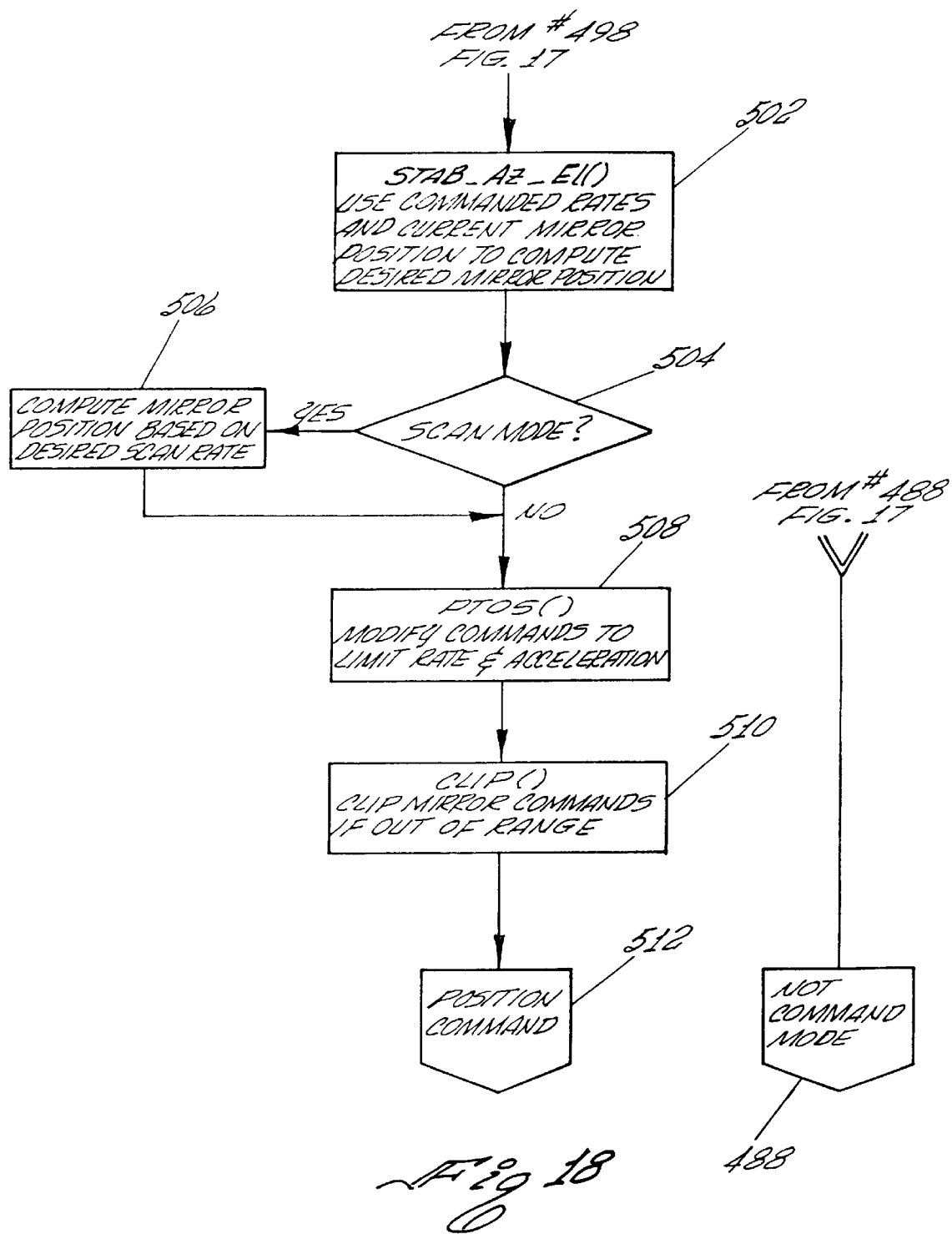
Figure 19:
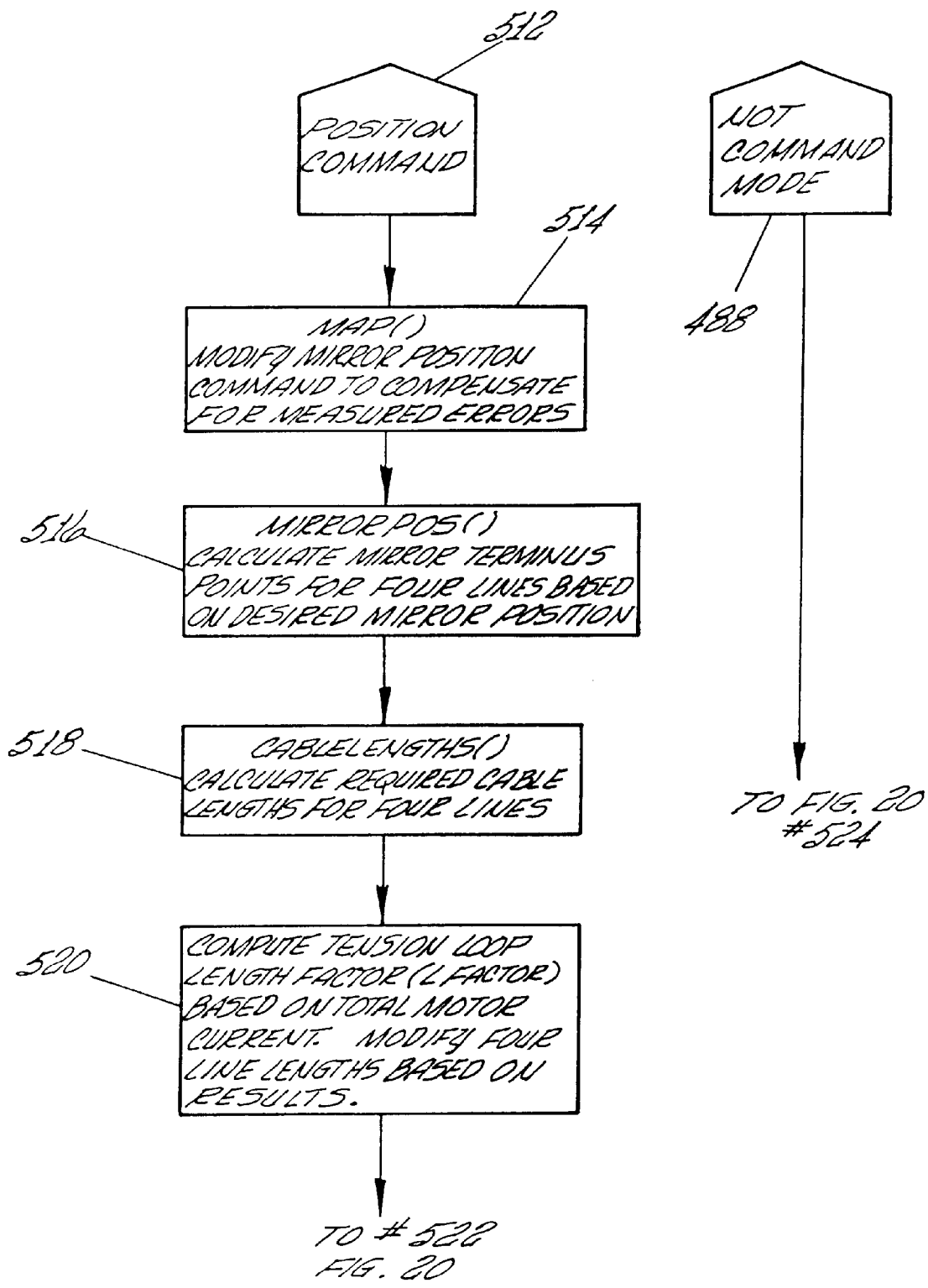
Figure 20:
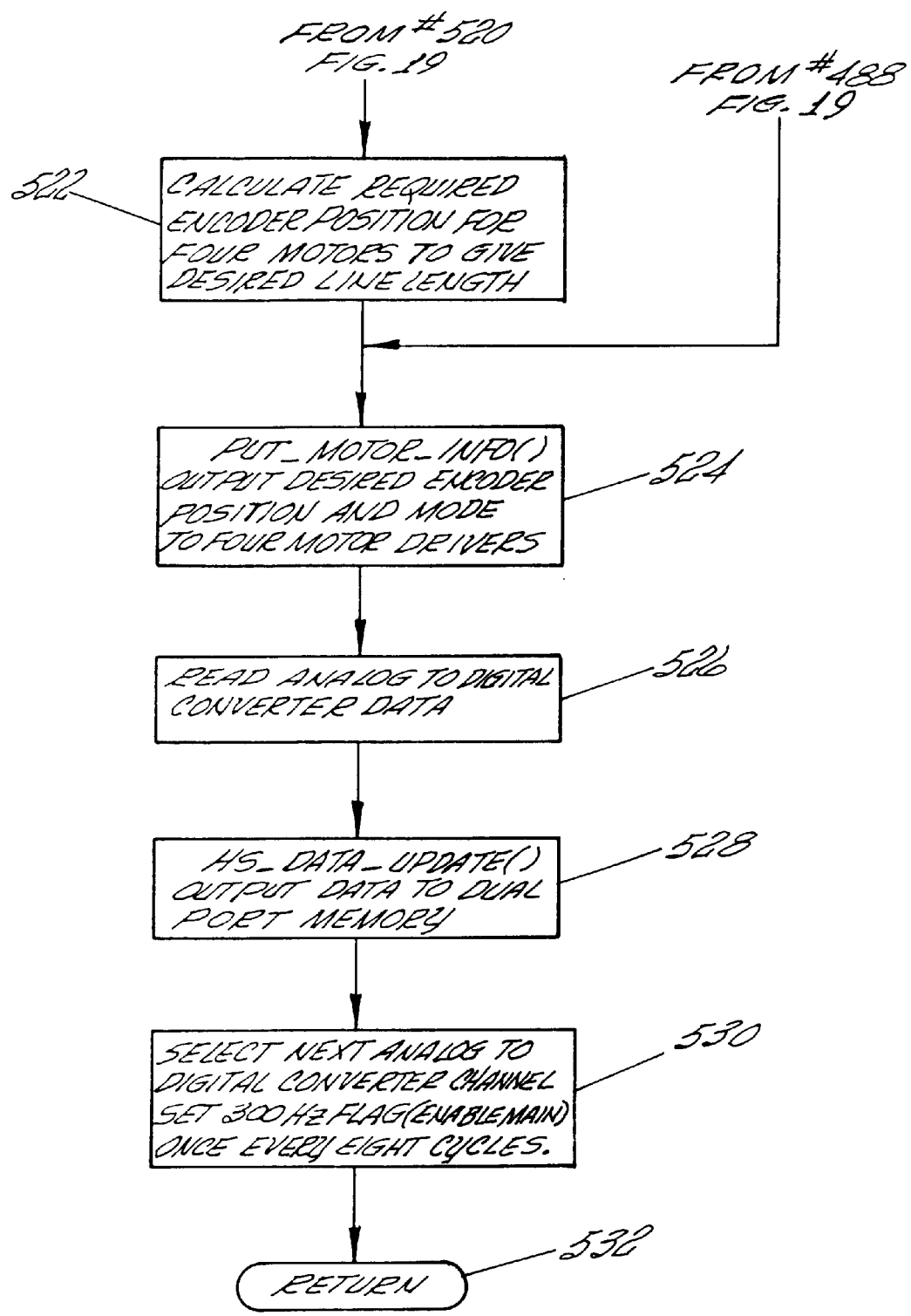

In addition to the various modes that are controlled by the 300-Hz loop of FIGS. 13 and 14, several subroutines are run, including TEST_OUT( ), which handles low-speed dual port communications. These communications are mainly for test and evaluation purposes and send such gimbal parameters as motor current, encoder position, line tension, initialization camera target data and tracker error. The gimbal mirror 22 also receives commands such as the position and mode commands for error mapping.

The software for system 20 includes two additional subroutines, Image Roll( ) and Vid_Roll( ), which calculate the image roll due to mirror position and send that roll data to image deroll hardware. In addition to sending roll information to the deroll hardware, Vid_Roll( ) can also adjust the image zoom factor through the use of a joystick control. The amount of roll in the image is caused by reflecting an image off a mirror at an arbitrary angle followed by a reflection off a fixed mirror and is defined by the following equation:

$$\text{image\_roll (rad)} = \arctan\frac{-2 \times \sin(\theta\_M) \times \cos(\theta\_M) \times \sin(\psi\_M)}{2 \times \sin(\text{stat}\_M) \times \sin(\theta\_M) \times \cos(\theta\_M)\cos(\psi\_M) - 2 \times \cos(\text{stat}\_M) \times \sin(\theta\_M)^2 + \cos(\text{stat}\_M)} \quad (11)$$

where:
$\theta\_M$=movable mirror pitch angle in radians
$\theta\_M$=movable mirror yaw angle in radians
stat_M=stationary mirror pitch angle in radians The inner position loop flow chart is illustrated in FIGS. 15–20. The inner loop operates at 2400 Hz and is where a substantial portion of the mirror tracking and operational capabilities for ball joint gimbal system 20 are provided. The inner position loop is controlled by a hardware interrupt that calls the subroutine c_intO1( ) (program step 460). This subroutine first checks to see if a RESETFLG is true (program step 462). If RESETFLG is true, indicating that a new bore-sight position is being set (program step 462), the current mirror azimuth and elevation position must be set to zero along with the four relative encoder positions for encoders 96, 106, 116 and 126.

The motor controllers for motors 94, 104, 114 and 124 keep track of two encoder counters. The first encoder counter is an absolute counter that is zeroed by a hardware index mark that is etched on the encoder wheel of each encoder 96, 106, 116 and 126. This hardware reset is only performed once during startup when the mirror 22 is being moved out of a known mechanical stop. This is the only way system 20 has of knowing where mirror 22 is when system 20 is powered up. The second encoder counter always reads zero when mirror 20 is bore-sighted. In this way, all the algorithms that drive mirror 22 can work relative to the zero bore-sight position instead of keeping track of an offset relative to an absolute encoder value for each encoder 96, 106, 116 and 126. If RESETFLG is false, the motor drivers are put in a run mode (program step 466) and the Get_Motor_Info( ) subroutine is run (program step 468). The Get_Motor_Info( ) subroutine reads the current position, rate, and amperage of each of the four motor/encoder assemblies 50, 52, 54 and 56.

The position loop flow chart software of FIGS. 14–20, next checks to determine if system 20 is in the command mode (program step 470). If system 20 is not in the command mode, system 20 is in the initialization mode, which means that a substantial portion of the inner loop of FIGS. 14–20 is not run, and each motor is being driven from commands generated by the homesequence( ) algorithm (program step 434). All motor driver commands are sent to the motor controllers for motors 94, 104, 114 and 124 by a Put_Motor_Info( ) subroutine (program step 524).

If system 20 is in the command mode, the inner loop must calculate the position of each of the four encoders 96, 106, 116 and 126 based on a desired mirror position for mirror 22. First, the last mirror position for mirror 22 is stored and the current mirror position is set to the last command (program step 472). Next, a check is made to see if system 20 is in the caged mode (program step 474). If system 20 is in the caged mode, the mirror position for mirror 20 is forced to zero pitch and zero yaw (program step 464). Instead of sending mirror 22 to the bore sight with an abrupt step through, a rate command is generated based on the mirror position error and mirror 20 is slewed to the bore sight over several interrupt cycles.

If system 20 is not being caged, a check is made to see if the joystick is being used to drive the mirror 22 (program step 480). If the joystick is being use to drive mirror 22, a rate command is generated based on the joystick values read from an analog to digital converter (program step 482). The software for system 20 includes a subroutine CMD_Rate[0] which relates to body roll (e.g. of a missile) and is not driven by the joystick. The software for system 20 includes subroutines CMD_Rate[1] and CMD_Rate[2] which relate to pitch and yaw motion, respectively and are driven by the joystick. If the joystick is not being used, the command rates are set to zero (program step 484).

A subroutine sw[1] is checked to see if system 20 is in the stabilization mode (program step 490). If system 20 is in the stabilization mode, Inertial Data from the inertial measurement unit (IMU) is summed with the command rates (program step 496). Finally, the command rates are modified by tracker error data if system 20 is in the track mode (program steps 494 and 496).

If the system is in error mapping mode as indicated by a subroutine sw[14], the previously generated command rates are ignored and new command rates are generated based on commanded mirror positions received through a dual-port interface from the external computer (program steps 498 and 500). Similar to the cage mode of operation, these command rates are generated by taking the difference between the current mirror position and the desired mirror position and smoothly moving mirror 22 over several interrupt cycles instead of an abrupt step to move mirror 22.

Alternatively, if the system is in map mode and flag Map_Sys Cmd is true, the command rates are generated by using the autocollimator error read in through the analog to digital converter. Because the autocollimator error coordinate system is fixed, but the mirror coordinate system changes according to the calibration table's roll position, the error data must be rolled by the same amount before the data can be used to close the loop around mirror 22.

After the command rates are generated, they are converted to mirror position commands or signals for mirror 22 within a subroutine Stab_Az El( ) (program step 502). The command rates are in body coordinates, and because the ball joint gimbal system 20 is an imaging gimbal, the mirror position commands/rates relate to line of sight rates of the image. The mirror position rates, however, do not have a one-to-one correlation with these LOS rates and have varying cross-coupling terms based on mirror position.

Once the desired mirror position is calculated for the interrupt cycle STAB_Az_El( ) (program step 502), a check is made to see if gimbal mirror 22 is in the demonstration scan mode (program step 504). If system 20 is. in this mode, new mirror position commands for mirror 22 are generated based on an algorithm to scan the mirror 15 degrees at a rate of 62.5 degrees per second.

Because mirror 22 has low inertia, and motors 94, 104, 114 and 124 can generate high torque, the command shaping algorithm, PTOS( ), is run next to control mirror accelerations and rates for mirror 22 (program step 508). During program step 510, the mirror position commands are modified by a clip( ) subroutine to ensure they stay within a safe operating region and do not drive mirror 22 into mechanical stops.

After the desired mirror position command for mirror 22 is calculated, a subroutine map( ) is run to compensate for mirror positional errors that were measured in the mapping process (program step 514). This is accomplished by looking up the errors for the desired mirror position in an array and modifying the commanded position to remove these errors. If the desired position does not fall exactly on an array element, the nearest neighbor bilinear interpolation is used to compute the error value.

Next the software determines where the four motor/encoder assembles 50, 52, 54 and 56 need to be to provide the desired position for mirror 22. First, a mirrorpos( ) subroutine is run to find the theoretical location of the four mirror terminus points when mirror 22 is at the desired angle (program step 516). These terminus points represent the points in space where the four lines 30, 32, 34 and 36 attach to mirror 22. This is accomplished using Euler angles by first rotating the nominal mirror terminus points (the location of the terminus points when mirror 22 is bore sighted) by the azimuth angle command, then by the elevation angle command. During program step 518, the length of the four lines 30, 32, 34 and 36 is computed by taking the absolute value of the difference between the capstan terminus points and the mirror terminus points. This is accomplished by the cablelengths( ) subroutine.

During program step .530 the cable lengths of line 30, 32, 34 and 36 are then modified by the term length factor to ensure they maintain a desired average tension. Because line tension is directly proportional to motor current for motors 94, 104, 114 and 124, the tension is computed by summing the four motor currents and subtracting this from the desired average current reflected in a variable Itotal. This difference is then modified by a constant to give the tension loop a slow response time when compared to the overall position loop time constant to ensure the tension loop does not interfere with the response of the position loop. The nominal length factor value is one. When the average current is too low, the length factor will decrease. Conversely, when the average current is too high, the length factor will increase. The computed line lengths for lines 30, 32, 34 and 36 are now multiplied by length factor to either tighten or slacken the four lines 30, 32, 34 and 36 resulting in a respective increase or decrease in motor current. When the tension and hence the current equals the desired average current, the tension loop will settle out.

The final step (program step 522) required before sending the encoder position commands to the four motor drivers for motors 94, 104, 114 and 124 is to compute the desired encoder positions by subtracting the desired line length from the line length when the mirror 22 is bore sighted. This result is then divided by the capstan circumference to give the amount of rotation in radians necessary to give the desired change in length. The desired encoder positions are then fed to the four motor drivers for motors 94, 104, 114 and 124 by the subroutine Put_Motor Info( ) (program step 524).

The remainder of the 2400-Hz loop (program steps 526, 528 and 530) reads data in from the A/D converter and handles the high-speed dual-port communications. High-speed data includes out putting mirror position and in putting mirror position and rate commands. The high-speed communications are used when the external computer wants to drive the inner position loop at the highest speed, lowest latency possible. This is necessary when the external computer is handling stabilization, scanning, or tracking functions.

From the foregoing, it may readily be seen that the present invention comprises a new, unique and exceedingly causeway mooring apparatus for ball joint gimbal system for steering a gimballed mirror in a missile's seeker which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A ball joint gimbal system for use with a seeker of a missile to track a target comprising:

a gimballed mirror positioned within the seeker of said missile for receiving image forming light from said target and then directing said image forming light along a first light path;

a fixed mirror positioned on said first light path to receive said image forming light from said gimballed mirror and then direct said image forming light along a second light path;

focusing optics positioned on said second light path to receive said image forming light from said fixed mirror, said focusing optics focusing said image forming light on a fixed imager positioned on said second light path;

a ball joint rotatably coupled to said gimballed mirror to allow for rotational movement said gimballed mirror about said ball joint;

first, second, third and fourth braided lines, each of said first, second, third and fourth braided lines having one end thereof connected to said gimballed mirror;

servo motor means connected to an other end of said first, second, third and fourth braided lines; and digital signal processor means for receiving steering signals from an external steering device, said digital signal processing means processing said steering signals to generate mirror position commands and provide said mirror position commands to said servo motor means;

said servo motor means, responsive to said mirror position commands, continuously adjusting a length for each of said first, second, third and fourth braided lines to steer said gimballed mirror and maintain a line of sight to said target to continuously track said target.

2. The ball joint gimbal system of claim 1 wherein said servo motor means comprises:

first, second, third and fourth servo motors each having a shaft;

first, second, third and fourth capstans, each of said first, second, third and fourth capstans being attached to the shaft of one of said first, second, third and fourth servo motors;

said first, second, third and fourth capstans having the other end of one of said first, second, third and fourth braided lines connected thereto;

said first, second, third and fourth servo motors rotating said first, second, third and fourth capstans to continuously adjust the length of each of said first, second, third and fourth braided lines to steer said gimballed mirror and maintain said line of sight to said target.

3. The ball joint gimbal system of claim 2 further comprising first, second, third and fourth optical encoders, each of said first, second, third and fourth encoders being coupled to and integral with an associated one of said first, second, third and fourth servo motors.

4. The ball joint gimbal system of claim 2 further comprising first, second, third and fourth pulleys, each of said first, second, third and fourth pulleys communicating with one of said first, second, third and fourth braided lines, each of said first, second, third and fourth pulleys being positioned between said gimballed mirror and one of said first, second, third and fourth capstans.

5. The ball joint gimbal system of claim 1 wherein each of said first, second, third and fourth braided lines comprises a KEVLAR line fabricated from 8×195 denier braided KEVLAR.

6. The ball joint gimbal system of claim 1 wherein said focusing optics comprises a lens.

7. The ball joint gimbal system of claim 1 wherein said digital signal processor means comprises a digital computer.

8. The ball joint gimbal system of claim 1 wherein said gimballed mirror has a 3.5 inch diameter, a thickness of about 0.375 inches and is fabricated from aluminum.

9. The ball joint gimbal system of claim 1 wherein said digital signal processing means includes a computer software program which provides for a joystick mode of operation during which a joystick supplies said steering signals to said digital signal processing means.

10. A ball joint gimbal system for use with a seeker of a missile to track a target comprising:

a gimballed mirror positioned within the seeker of said missile for receiving image forming light from said target and then directing said image forming light along a first light path;

a fixed mirror positioned on said first light path to receive said image forming light from said gimballed mirror and then direct said image forming light along a second light path;

a focusing lens positioned on said second light path to receive said image forming light from said fixed mirror, said focusing lens focusing said image forming light on a fixed imager positioned on said second light path;

a ball joint rotatably coupled to said gimballed mirror to allow for rotational movement said gimballed mirror about said ball joint;

first, second, third and fourth braided lines, each of said first, second, third and fourth braided lines having one end thereof connected to said gimballed mirror; and a position servo system connected to an other end of said first, second, third and fourth braided lines;

a digital computer for receiving steering signals from an external steering device, said digital computer processing said steering signals to generate mirror position commands;

said position servo system being connected to said digital computer to receive said mirror position commands; said position servo system including:

first, second, third and fourth servo motors each having a shaft, said first, second, third and fourth servo motors being connected to said digital computer to receive said mirror position commands;

first, second, third and fourth capstans, each of said first, second, third and fourth capstans being attached to the shaft of one of said first, second, third and fourth servo motors;

said first, second, third and fourth capstans having the other end of one of said first, second, third and fourth braided lines connected thereto;

said first, second, third and fourth servo motors, responsive to said mirror position commands, rotating said first, second, third and fourth capstans to continuously adjust the length of each of said first, second, third and fourth braided lines to steer said gimballed mirror and maintain a line of sight to said target;

first, second, third and fourth optical encoders, each of said first, second, third and fourth encoders being coupled to and integral with an associated one of said first, second, third and fourth servo motors, each of said first, second, third and fourth optical encoders measuring and then providing a sinewave signal which is representative of an angular position of the shaft of said associated one of said first, second, third and fourth servo motors.

11. The ball joint gimbal system of claim 10 further comprising first, second, third and fourth pulleys, each of said first, second, third and fourth pulleys communicating with one of said first, second, third and fourth braided lines, each of said first, second, third and fourth pulleys being positioned between said gimballed mirror and one of said first, second, third and fourth capstans.

12. The ball joint gimbal system of claim 10 wherein each of said first, second, third and fourth braided lines comprises a KEVLAR line fabricated from 8×195 denier braided KEVLAR.

13. The ball joint gimbal system of claim 10 wherein said digital computer, responsive to the sinewave signal from each of said first, second, third and fourth optical encoders, generates first, second, third and fourth capstan angle commands and provides said first, second, third and fourth capstan angle commands respectively to said first, second, third and fourth servo motors.

14. The ball joint gimbal system of claim 10 wherein said digital computer includes a computer software program which provides for a joystick mode of operation during which a joystick supplies said steering signals to said digital computer.

15. The ball joint gimbal system of claim 10 wherein said gimballed mirror has a 3.5 inch diameter, a thickness of about 0.375 inches and is fabricated from aluminum.

16. The ball joint gimbal of claim 13 further comprising:

first, second, third and fourth digital to analog converters connected to said digital computer;

first, second, third and fourth current amplifiers respectively connected to said first, second, third and fourth digital to analog converters; and said first, second, third and fourth digital to analog converters being respectively connected to said first, second, third and fourth servo motors.

17. A ball joint gimbal system for use with a seeker of a missile to track a target comprising:

a gimballed mirror positioned within the seeker of said missile for receiving image forming light from said target and then directing said image forming light along a first light path;

a fixed mirror positioned on said first light path to receive said image forming light from said gimballed mirror and then direct said image forming light along a second light path;

a focusing lens positioned on said second light path to receive said image forming light from said fixed mirror, said focusing lens focusing said image forming light on a fixed imager positioned on said second light path;

a ball joint rotatably coupled to said gimballed mirror to allow for rotational movement said gimballed mirror about said ball joint;

first, second, third and fourth braided lines, each of said first, second, third and fourth braided lines having one end thereof connected to said gimballed mirror; and a position servo system connected to an other end of said first, second, third and fourth braided lines;

said position servo system including:

first, second, third and fourth servo motors each having a shaft;

first, second, third and fourth capstans, each of said first, second, third and fourth capstans being attached to the shaft of one of said first, second, third and fourth servo motors;

said first, second, third and fourth capstans having the other end of one of said first, second, third and fourth braided lines connected thereto;

first, second, third and fourth optical encoders, each of said first, second, third and fourth encoders being coupled to and integral with an associated one of said first, second, third and fourth servo motors, each of said first, second, third and fourth optical encoders measuring and then providing a sinewave signal which is representative of an angular position of the shaft of said associated one of said first, second, third and fourth servo motors a digital computer connected to said first, second, third and fourth optical encoders to receive the sinewave signal from each of said first, second, third and fourth optical encoders, said digital computer processing the sinewave signal from each of said first, second, third and fourth optical encoders to generate capstan angle commands and provide said capstan angle commands to said first, second, third and fourth servo motors;

said digital computer receiving steering commands from steering signals from an external steering device, said digital computer processing said steering signals to generate mirror position commands and provide said mirror position commands to said first, second, third and fourth servo motors; and said first, second, third and fourth servo motors, responsive to said capstan angle commands and said mirror position commands, rotating said first, second, third and fourth capstans to continuously adjust the length of each of said first, second, third and fourth braided lines to steer said gimballed mirror and maintain a line of sight to said target.

18. The ball joint gimbal system of claim 17 further comprising first, second, third and fourth pulleys, each of said first, second, third and fourth pulleys communicating with one of said first, second, third and fourth braided lines, each of said first, second, third and fourth pulleys being positioned between said gimballed mirror and one of said first, second, third and fourth capstans.

19. The ball joint gimbal system of claim 17 wherein each of said first, second, third and fourth braided lines comprises a KEVLAR line fabricated from 8×195 denier braided KEVLAR.

20. The ball joint gimbal system of claim 17 wherein said gimballed mirror has a 3.5 inch diameter, a thickness of about 0.375 inches and is fabricated from aluminum.

* * * * *